United States Patent
Itani et al.

(10) Patent No.: US 8,805,724 B2
(45) Date of Patent: Aug. 12, 2014

(54) INTELLIGENT CUSTOMER RETENTION AND OFFER/CUSTOMER MATCHING

(75) Inventors: Ibrahim M. Itani, Irving, TX (US); Yogesh Sawant, Irving, TX (US); Muhammed Shaphy, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1637 days.

(21) Appl. No.: 11/959,156

(22) Filed: Dec. 18, 2007

(65) Prior Publication Data
US 2009/0157449 A1   Jun. 18, 2009

(51) Int. Cl.
G06Q 99/00   (2006.01)
G06Q 30/06   (2012.01)
G06Q 30/02   (2012.01)
G06Q 30/00   (2012.01)

(52) U.S. Cl.
CPC ........ *G06Q 30/0631* (2013.01); *G06Q 30/0282* (2013.01); *G06Q 30/0224* (2013.01); *G06Q 30/016* (2013.01)
USPC ........................ 705/14.66; 705/26.7; 705/347

(58) Field of Classification Search
USPC ...................... 705/14.66, 26.7, 347
See application file for complete search history.

(56) References Cited

U.S. PATENT DOCUMENTS

| | | | | |
|---|---|---|---|---|
| 7,047,251 B2* | 5/2006 | Reed et al. | | 1/1 |
| 7,464,092 B2* | 12/2008 | Lee et al. | | 1/1 |
| 7,467,106 B1* | 12/2008 | Levine et al. | | 705/35 |
| 7,536,002 B1* | 5/2009 | Ma et al. | | 379/266.02 |
| 7,610,575 B2* | 10/2009 | Sproule | | 717/103 |
| 7,698,163 B2* | 4/2010 | Reed et al. | | 705/7.33 |
| 7,707,059 B2* | 4/2010 | Reed et al. | | 705/7.31 |
| 2001/0032128 A1* | 10/2001 | Kepecs | | 705/14 |
| 2004/0102980 A1* | 5/2004 | Reed et al. | | 705/1 |
| 2004/0103017 A1* | 5/2004 | Reed et al. | | 705/10 |
| 2004/0103051 A1* | 5/2004 | Reed et al. | | 705/36 |
| 2004/0133876 A1* | 7/2004 | Sproule | | 717/105 |
| 2005/0102249 A1* | 5/2005 | Bigus | | 706/47 |
| 2005/0289000 A1* | 12/2005 | Chiang et al. | | 705/14 |
| 2006/0047563 A1* | 3/2006 | Wardell | | 705/10 |
| 2006/0212355 A1* | 9/2006 | Teague et al. | | 705/14 |
| 2006/0212388 A1* | 9/2006 | Van Luchene et al. | | 705/39 |
| 2007/0061190 A1* | 3/2007 | Wardell | | 705/10 |
| 2007/0116036 A1* | 5/2007 | Moore | | 370/462 |
| 2007/0211881 A1* | 9/2007 | Parker-Stephen | | 379/265.01 |
| 2008/0021813 A1* | 1/2008 | Simpson et al. | | 705/38 |
| 2008/0077462 A1* | 3/2008 | Patel et al. | | 705/7 |

* cited by examiner

Primary Examiner — James D Nigh

(57) ABSTRACT

A device receives offer information associated with one or more products or services, receives customer information, and matches the offer information with the customer information based on one or more of system defined rules or user defined rules. The device also generates matched offer and customer information based on the match, and conveys the matched offer and customer information to one or more customers.

20 Claims, 19 Drawing Sheets

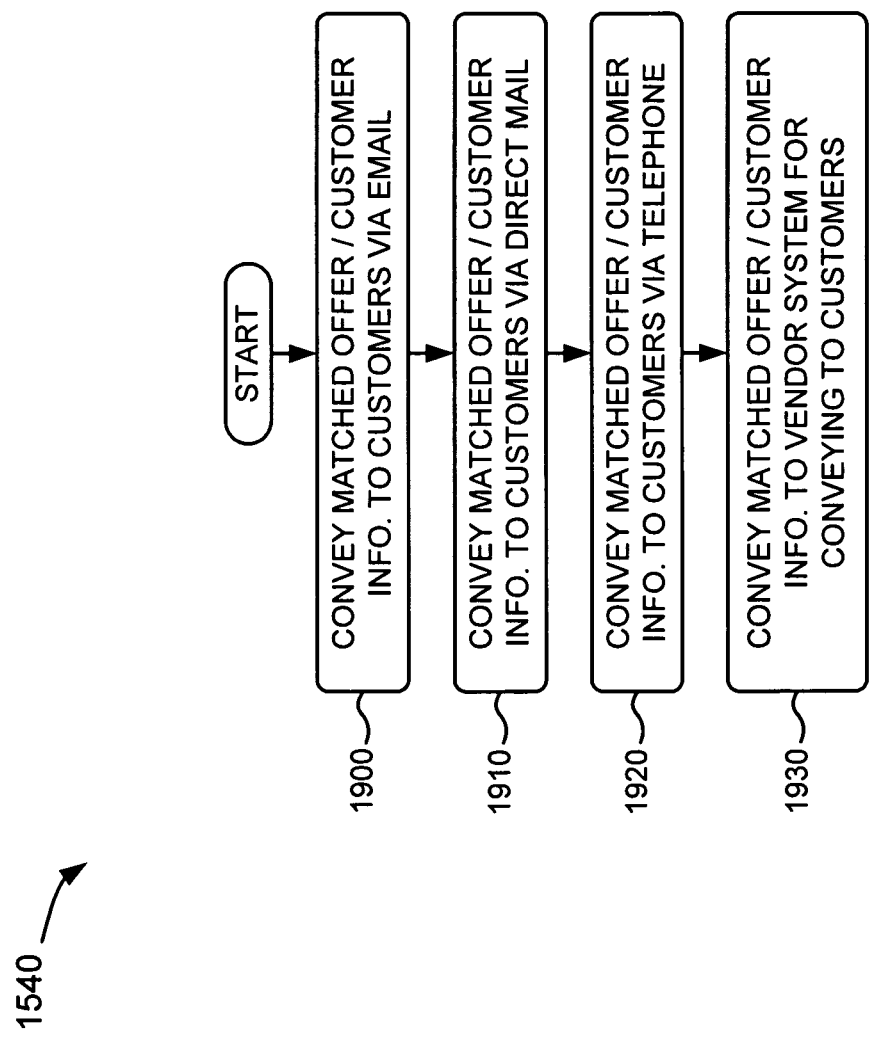

INTELLIGENT CUSTOMER RETENTION AND OFFER/CUSTOMER MATCHING

BACKGROUND

Retaining existing customers, winning back lost customers, and obtaining new customers is a constant challenge for any organization offering a product or service. In an effort to retain customers (e.g., to reduce churn), some organizations extend credit (e.g., monetary) and products or services (e.g., product and service bundles with lower total prices compared to individual products or services in the bundle) offers during interactions with customers. At any given time, there may exist hundreds of offers that may be extended to customers. The burden of selecting a correct offer that is least expensive to an organization and still entices the customer is on front line employees (e.g., customer service associates, marketing managers, etc.). Some organizations may have extensive and meticulous systems to manage credit and product/service offers that may be extended to customers. However, the management of such offers is entirely manual.

For example, credit and product/service offers may be entered into a master offer table (e.g., a process referred to as "tabling") by a marketing manager. Once the offers are tabled, the marketing manager may communicate the introduction of the new offer(s) to the field (e.g., to field representatives). The field representatives may consult with the marketing manager, and may draft a document called a methods and procedures ("M&P") document. The M&P document may detail a purpose of a new offer, define which customers are eligible for the new offer, define a priority of the new offer compared to other offers, and/or define when to use (or not to use) the new offer. The field representatives may use the M&P document to train marketing coaches (e.g., call center coaches). The marketing coaches may disseminate the knowledge to customer service representatives who then apply the knowledge to extend an appropriate offer to customers.

The process of matching credit and product/service offers to the customer is manually performed and creates the possibility for errors. For example, there may be hundreds of offers associated with the M&P documents. Thus, the possibility of a customer service representative using the wrong offer is very high. The customer service representative can only handle a limited amount of information within the five to ten minutes that they interact with the customer. Furthermore, the M&P documents may include hundreds of checklists that need to be memorized by the customer service representative, which further increases the potential for error. The customer service representatives may forget information contained in the M&P documents (e.g., due to lack of continued evaluation of the customer service representatives' knowledge of the M&P documents), and may have a tendency to forget, overlook, and/or confuse information contained in older M&P documents when they are trained on new M&P documents.

BRIEF DESCRIPTION OF THE DRAWINGS

FIGS. 13-19 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that retain existing customers, win back lost customers, and provide an offer management application for automatically managing, matching, filtering, and/or prioritizing credit and product/service offers available to customers based on a variety of factors (e.g., customer profile, churn score, credit history, treatment history, current account products, market intelligence, etc.). For example, in one implementation, the offer management application may receive offer information and customer information, and may match the offer information with the customer information based on system defined rules and user defined rules. The offer management application may generate matched offer/customer information based on the matching, and may convey the matched offer/customer information to customers. Feedback may be received by the offer management application from the customers about the matched offer/customer information, and the offer management application may update the matched offer/customer information based on the received feedback.

A "product," as the term is used herein, is to be broadly interpreted to include any thing that may be marketed or sold as a commodity or a good. For example, in one implementation, a product may include a device, such as a radiotelephone, a personal communications system (PCS) terminal, a personal digital assistant (PDA), a laptop, a personal computer, other types of computation or communication devices, etc.

A "service," as the term is used herein, is to be broadly interpreted to include any act or variety of work done for others (e.g., for compensation). For example, in one implementation, a service may include telecommunication services, such as telephone services, Internet services, network services, radio services, television services, video services, etc.

Figure 1:
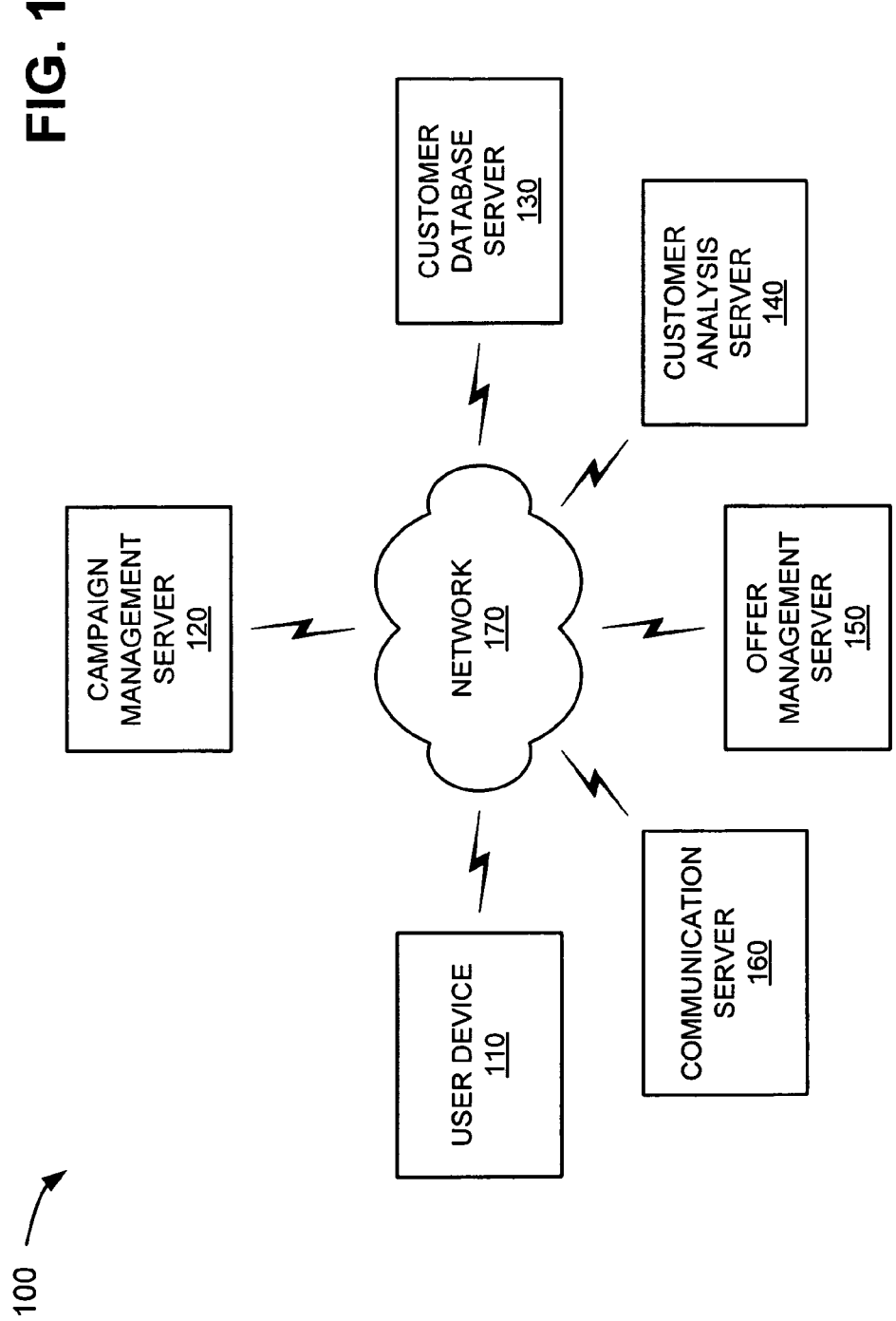
FIG. 1 is an exemplary diagram of a network in which systems and methods described herein may be implemented.

FIG. 1 is an exemplary diagram of a network 100 in which systems and methods described herein may be implemented. As illustrated, network 100 may include a user device 110, a campaign management server 120, a customer database server 130, a customer analysis server 140, an offer management server 150, and/or a communication server 160 interconnected by a network 170. User device 110, campaign management server 120, customer database server 130, customer analysis server 140, offer management server 150, and/or communication server 160 may connect to network 170 via wired and/or wireless connections. A single user device, campaign management server, customer database server, customer analysis server, offer management server, communication server, and network have been illustrated in FIG. 1 for simplicity. In practice, there may be more or less user devices, campaign management servers, customer database servers, customer analysis servers, offer management servers, communication servers, and/or networks. Also, in some instances, one or more of user device 110, campaign management server 120, customer database server 130, customer analysis server 140, offer management server 150, and/or communication server 160 may perform one or more functions described as being performed by another one or more of user device 110, campaign management server 120, customer database server 130, customer analysis server 140, offer management server 150, and/or communication server 160.

User device 110 may include a radiotelephone, a PCS terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, an outbound calling module or terminal, an outbound email module, a device capable of auto dialing a telephone number, or other types of computation or communication devices, threads or processes running on these devices, and/or objects executable by these devices. In one implementation, user device 110 may include any device that is capable of accessing a software application or a web-based application (e.g., provided by offer management server 150) that enables a user (e.g., a marketing manager, a product manager, a service manager, a product line manager, etc.) of user device 110 to manage credit and product/service offers based on a variety of factors. In another implementation, user device 110 may include any device (e.g., an outbound calling module, an outbound email module, direct mail generator, an auto dialer, etc.) that enables a user (e.g., a telemarketer, a marketing employee, customer service representative, etc.) to access the credit and product/service offers so that the user may convey the credit and product/service offers to customers.

Campaign management server 120 may include one or more server entities, or other types of computation or communication devices, that gather, process, search, and/or provide information in a manner described herein. In one implementation, campaign management server 120 may provide a software application or a web-based application (e.g., a campaign management application) that manages, generates, saves, and/or executes a marketing campaign and/or a customer list for one or more products and/or one or more services. In another implementation, campaign management server 120 may include the features set forth in co-pending application Ser. No. 11/959,131, entitled "MARKETING CAMPAIGN MANAGEMENT," filed on the same date herewith, the disclosure of which is incorporated by reference herein in its entirety. Further details of campaign management server 120 are provided below in connection with FIGS. 3 and 4.

Customer database server 130 may include one or more server entities, or other types of computation or communication devices, that gather, process, search, and/or provide information in a manner described herein. In one implementation, customer database server 130 may include one or more devices that may receive and/or store internal customer data associated with existing and/or potential customers (e.g., customer data that may be internal to an organization offering products and/or services), sourced customer data associated with existing and/or potential customers (e.g., customer data that may received from a source external to an organization offering products and/or services), and/or customer models (e.g., customer loyalty models, customer retention models, customer attrition models, etc.). Customer database server 130 may provide the internal and/or sourced customer data, the customer models, and/or customer reports to campaign management server 120. Campaign management server 120 may use such information to manage and/or generate a marketing campaign and/or customer list. In another implementation, customer database server 130 may include the features set forth in co-pending application Ser. No. 11/959,131, entitled "MARKETING CAMPAIGN MANAGEMENT," filed on the same date herewith. Further details of customer database server 130 are provided below in connection with FIGS. 3 and 5.

Customer analysis server 140 may include one or more server entities, or other types of computation or communication devices, that gather, process, search, and/or provide information in a manner described herein. In one implementation, customer analysis server 140 may segment customer information (e.g., according to customer behavior and/or customer potential profitability), and may score the segmented customer information so that customers' needs may be met. Further details of customer analysis server 140 are provided below in connection with FIGS. 6 and 7.

Offer management server 150 may include one or more server entities, or other types of computation or communication devices, that gather, process, search, and/or provide information in a manner described herein. In one implementation, offer management server 150 may provide a software application or a web-based application (e.g., an offer management application) that automatically manages, matches, filters, and/or prioritizes credit and product/service offers available to customers based on a variety of factors (e.g., customer profile, churn score, credit history, treatment history, current account products, market intelligence, etc.). Further details of offer management server 150 are provided below in connection with FIGS. 8 and 9.

Communication server 160 may include one or more server entities, or other types of computation or communication devices, that gather, process, search, and/or provide information in a manner described herein. In one implementation, communication server 160 may receive campaign management information (e.g., from campaign management server 120), may receive customer analysis information (e.g., from customer database server 130 and/or customer analysis server 140), and/or may receive offer management information (e.g., from offer management server 150). Communication server 160 may combine the received information (e.g., the campaign management information, customer analysis information, and offer management information) into customer retention information (e.g., credit and product/service offers, marketing information, etc. used to retain, attract, win back, etc. customers). Communication server 160 may provide for display of the customer retention information to a marketer (e.g., a customer service representative) for conveying to a customer, and/or may convey the customer retention information directly to the customer (e.g., via email, direct mail, etc.). In other implementations, one or more of campaign management server 120, customer database server 130, customer analysis server 140, offer management server 150, and/or another device communicating with network 170 may perform one or more functions described as being performed by communication server 160. Such an arrangement may improve an organization's ability to retain at-risk customers, and may enable a customer service representative to discuss features and benefits with a customer who does not use their product and/or service, while a customer who has had multiple support issues may be offered special attention. The arrangement may provide the customers the right solution more quickly, may enhance the customer's experience, may provide retention offers driven by a customer's situation, etc.

Network 170 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

Figure 2:
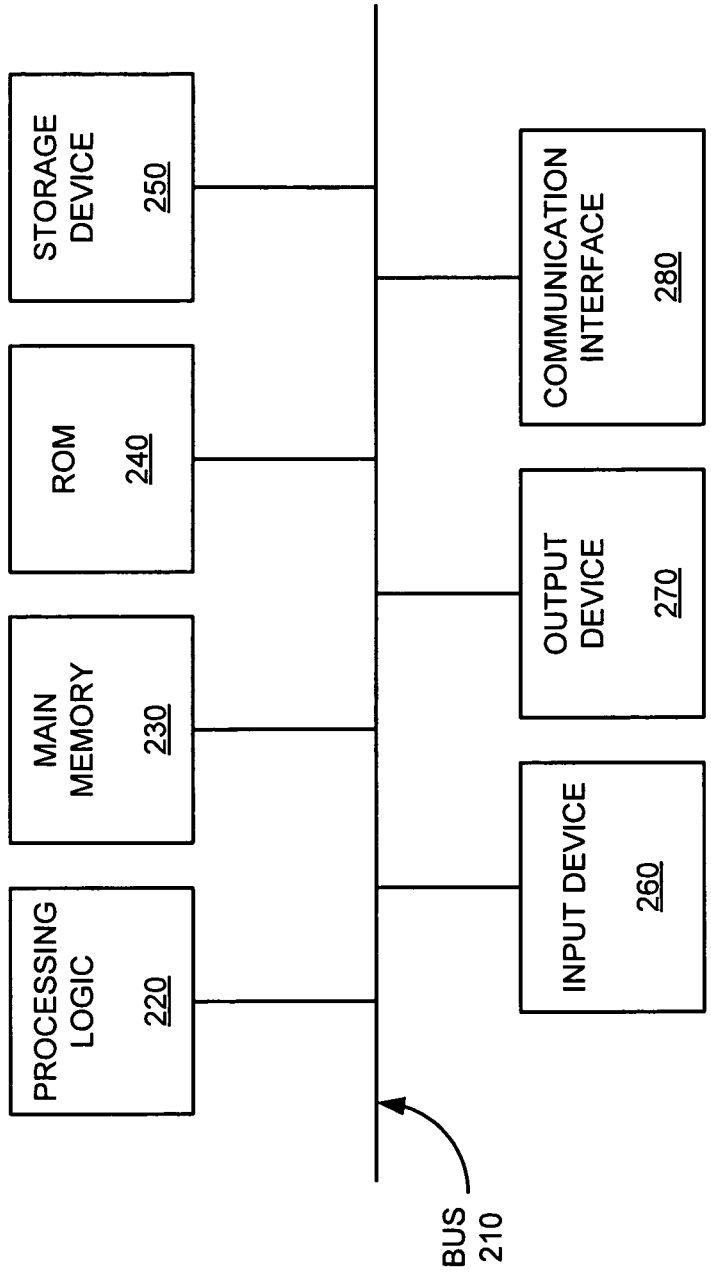
FIG. 2 illustrates exemplary components of a user device, a campaign management server, a customer database server, a customer analysis server, an offer management server, and/or a communication server of the network depicted in FIG. 1.

FIG. 2 is an exemplary diagram of a device 200 that may correspond to user device 110, campaign management server 120, customer database server 130, customer analysis server 140, offer management server 150, and/or communication server 160. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
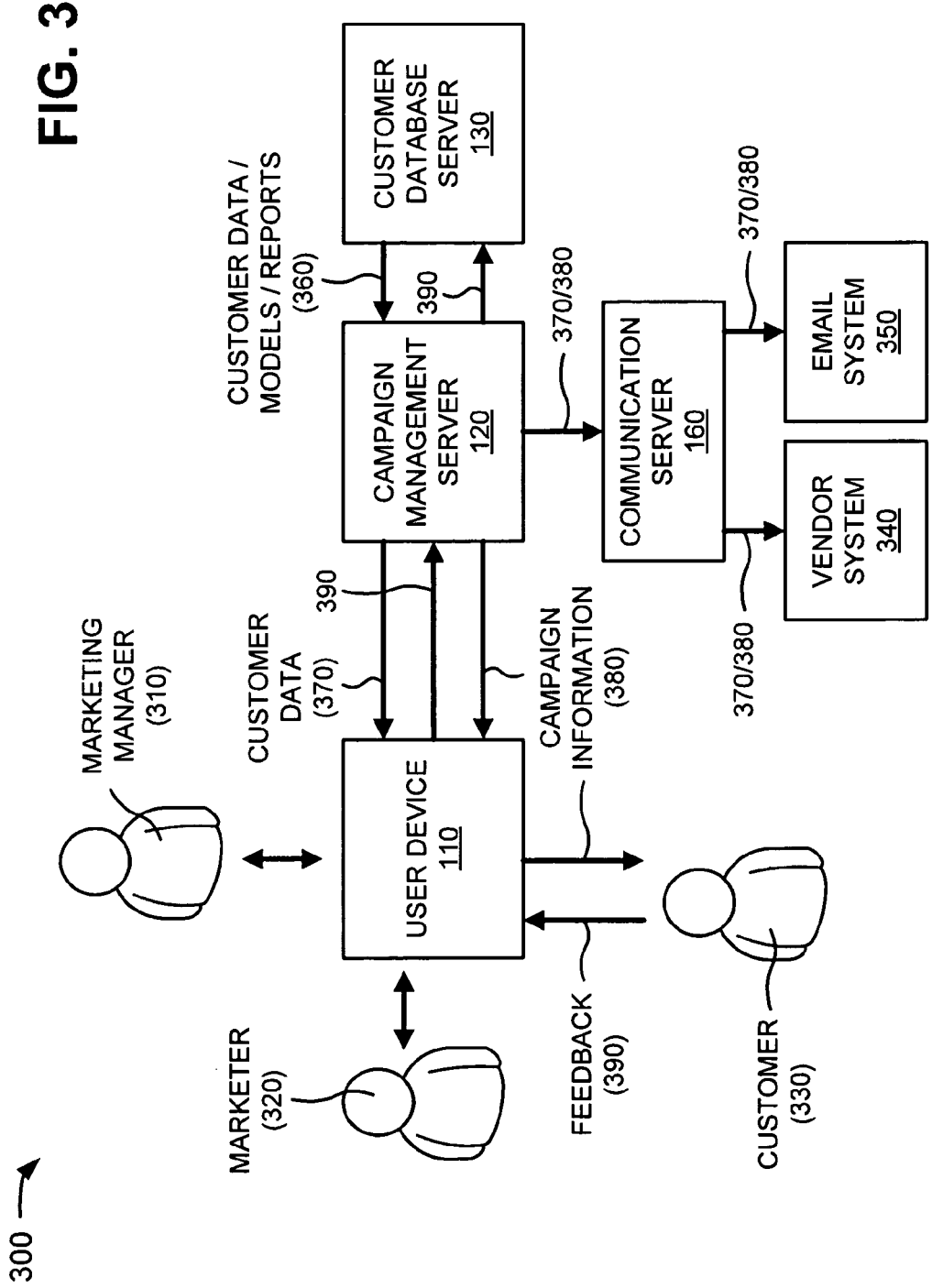
FIG. 3 depicts exemplary interactions between the user device, the campaign management server, the customer database server, and the communication server of the network illustrated in FIG. 1.

FIG. 3 depicts a portion 300 of network 100 (that includes user device 110, campaign management server 120, customer database server 130, and communication server 160), and exemplary interactions between user device 110, campaign management server 120, customer database server 130, and communication server 160. As illustrated, user device 110 may communicate with a marketing manager 310 (e.g., a user of user device 110), a marketer 320 (e.g., a user of user device 110), and/or a customer 330. As further illustrated in FIG. 3, campaign management server 120 may communicate with a vendor system 340 and/or an electronic mail ("email") system 350.

Marketing manager 310 may include any person in an organization responsible for marketing one or more products and/or one or more services offered by the organization. In one implementation, for example, marketing manager 310 may include a marketing executive, a product manager, a service manager, a product line manager, a customer service representative, etc. Marketing manager 310 may interact with campaign management server 120 (e.g., via user device 110) to manage, generate, save, and/or execute a marketing campaign and/or a customer list for one or more products and/or one or more services. For example, marketing manager 310 may input campaign properties (e.g., products to offer, services to offer, prices of products, prices of services, etc.) via user device 110.

Marketer 320 may include any person in an organization responsible for interacting with customers to market one or more products and/or one or more services offered by the organization. In one implementation, for example, marketer 320 may include a customer service representative, a telemarketer, an email marketer, a direct mail marketer, etc. Marketer 320 may interact with campaign management server 120 (e.g., via user device 110) to access one or more marketing campaigns and/or customer lists for one or more products and/or one or more services. In such instances, user device 110 may operate as an outbound calling module, an outbound email module, a device capable of autodialing a telephone number, etc.

Customer 330 may include any person or business entity (e.g., a company) capable of purchasing one or more products and/or one or more services offered by an organization. In one implementation, for example, customer 330 may include a purchaser or a potential purchaser of telecommunications services, an existing customer or a potential customer of telecommunication services.

Vendor system 340 may include one or more server entities, or other types of computation or communication devices, that gather, process, search, and/or provide information in a manner described herein. In one implementation, vendor system 340 may include one or more devices that may receive campaign information (e.g., marketing campaigns for one or more products and/or one or more services) and/or customer lists, and may provide the campaign information to one or more customers (e.g., customer 330) provided on the customer lists. In one example, vendor system 340 may include one or more devices associated with third party telemarketers (e.g., telemarketers not affiliated with the organization that operates campaign management server 120). The third party telemarketers may access one or more marketing campaigns and/or customer lists for one or more products and/or one or more services (e.g., via vendor system 340), and may market (e.g., via telephones) the one or more products/services to one or more customers provided in the customer lists.

Email system 350 may include one or more server entities, or other types of computation or communication devices, that gather, process, search, and/or provide information in a manner described herein. In one implementation, email system 350 may include one or more devices that may receive campaign information (e.g., marketing campaigns for one or more products and/or one or more services) and/or customer lists, and may provide, via email, the campaign information to one or more customers (e.g., customer 330) provided on the customer lists. In one example, email system 350 may include one or more devices associated with a third party (e.g., a party not affiliated with the organization that operates campaign management server 120). The third party may access one or more marketing campaigns and/or customer lists for one or more products and/or one or more services (e.g., via email system 350), and may market (e.g., via email) the one or more products/services to one or more customers provided ion the customer lists.

As further shown in FIG. 3, customer database server 130 may provide internal and/or sourced customer data, customer models, and/or customer reports (e.g., customer data/models/reports 360) to campaign management server 120. Campaign management server 120 may use customer data/models/reports 360 to manage and/or generate customer data 370 (e.g., a customer list that may include names, addresses, telephone numbers, personal information, company information, etc. of customers) and/or campaign information 380 (e.g., marketing campaigns for one or more products and/or one or more services). Campaign management server 120 may provide customer data 370 and/or campaign information 380 to user device 110 and communication server 160. Communication server 160 may provide customer data 370 and/or campaign information 380 to vendor system 340 and/or email system 350. Vendor system 340 and/or email system 350 may distribute campaign information 380 to customers (e.g., contained in customer data 370), as described above.

User device 110 (e.g., with or without marketer 320) may convey campaign information 380 to customer 330, and may receive feedback 390 (e.g., customer interest in a product, service, etc.) about campaign information 380 from customer 330. In one example, user device 110 may email campaign information 380 to customer 330. In another example, user device 110 may be used by marketer 320 to contact customer 330 and to convey campaign information 380 to marketer 320 while marketer 320 verbally interacts with customer 330 (e.g., a telemarketing arrangement). User device 110 may provide feedback 390 to campaign management server 120, and campaign management server 120 may provide feedback 390 to customer database server 130. Campaign management server 120 may also update customer data/models/reports 360 based on the received feedback 390, and may provide the updated customer data/models/reports 360 to customer database server 130.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
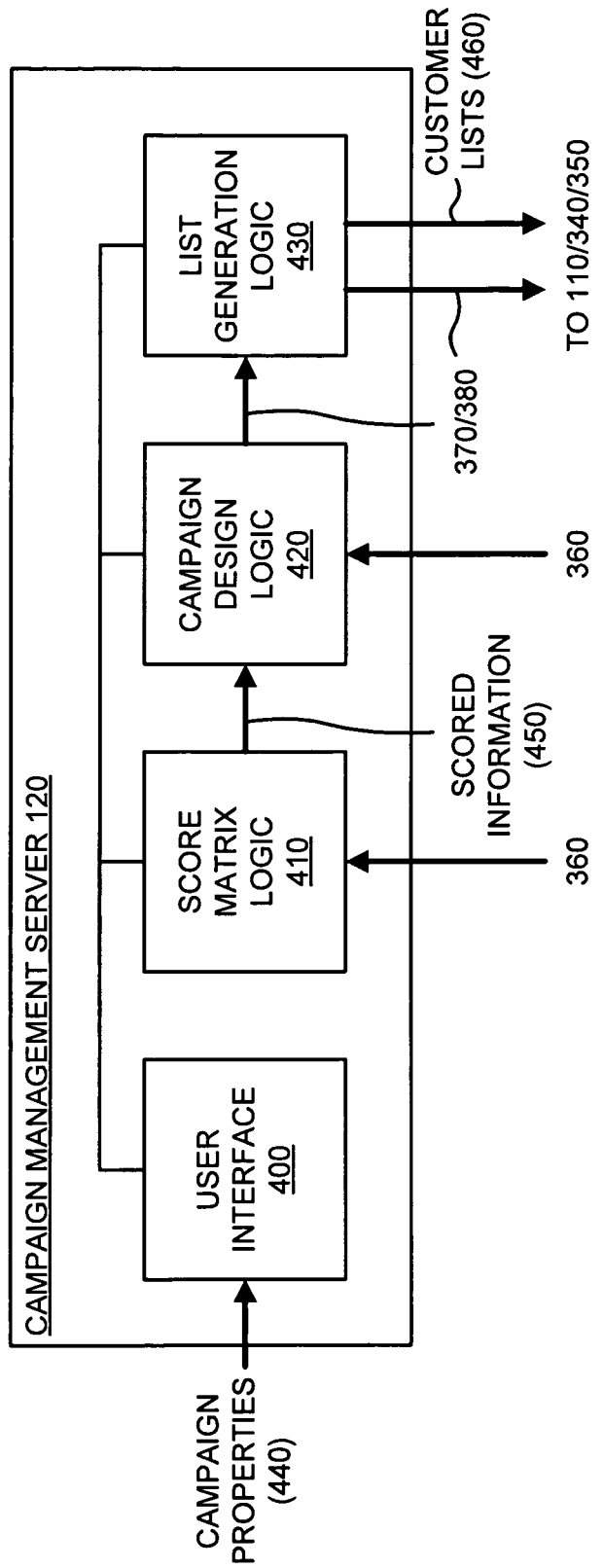
FIG. 4 depicts an exemplary functional block diagram of the campaign management server of the network illustrated in FIG. 1.

FIG. 4 depicts an exemplary functional block diagram of campaign management server 120. As illustrated, campaign management server 120 may include a user interface 400, score matrix logic 410, campaign design logic 420, and list generation logic 430. The functions described in FIG. 4 may be performed by one or more of the exemplary components of device 200 depicted in FIG. 2.

User interface 400 may include a graphical user interface (GUI) or a non-graphical user interface, such as a text-based interface. User interface 400 may provide information to users (e.g., marketing manager 310, marketer 320, etc.) via a customized interface (e.g., a proprietary interface) and/or other types of interfaces (e.g., a browser-based interface). User interface 400 may receive user inputs via one or more input devices (e.g., input device 260), may be user configurable (e.g., a user may change the size of user interface 400, information displayed in user interface 400, color schemes used by user interface 400, positions of text, images, icons, windows, etc., in user interface 400, etc.), and/or may not be user configurable. User interface 400 may be displayed to a user via one or more output devices (e.g., output device 270). In one implementation, as shown in FIG. 4, user interface 400 may receive campaign properties 440 (e.g., via inputs to user device 110 from marketing manager 310, marketer 320, etc.). Campaign properties 440 may include products to offer customers, services to offer customers, prices of products, prices of services, a mixture of products and services to offer customers, etc. Further details of campaign properties 440 are provided below in connection with FIG. 6.

Score matrix logic 410 may include any hardware and/or software based logic (e.g., processing logic 220) that enables campaign management server 120 to generate a dynamic score matrix that may identify customer segments, product attributes, service attributes, customer churn information (e.g., propensity of customers to cease doing business with an organization in a given time period), etc. for an organization based on customer data/models/reports 360. In one example, the score matrix may be used to produce information (e.g., scored information 450) associated with customer segments, product attributes, service attributes, etc. that may be assigned values (e.g., based on a likelihood of a product and/or a service being sold to one or more customers). Scored information 450 may enable campaign management server 120 to identify groups of customers that are similar such that a similar product and/or service may appeal to all members of the group. Scored information 450 may also enable campaign management server 120 to target a customer segment (e.g., where customers may agree on what they value, scored information 450 may increase chances that a product and/or service may succeed, and may connect with the target customers). Score matrix logic 410 may provide scored information 450 to campaign design logic 360. Further details of the score matrix are provided below in connection with FIG. 8.

Campaign design logic 420 may include any hardware and/or software based logic (e.g., processing logic 220) that enables campaign management server 120 to design a marketing campaign for one products and/or services that may be tailored to one or more customers. In one implementation, campaign design logic 420 may receive customer data/models/reports 360, campaign properties 440, and/or scored information 450 and may design a marketing campaign based on customer data/models/reports 360, campaign properties 440, and/or scored information 450. The designed marketing campaign may include customer data 370 (e.g., a customer list that may include names, addresses, telephone numbers, personal information, company information, etc. of customers) and/or campaign information 380 (e.g., marketing campaigns for one or more products and/or one or more services). Customer data 370 and/or campaign information 380 may be provided to list generation logic 430.

Campaign design logic 420 may enable a user (e.g., via user device 110) to create, save, and/or execute marketing campaigns directed to one or more products and/or one or more services that may be derived from a customer churn model (e.g., provided by customer database server 130). In one example, campaign design logic 420 may perform a "what-if" analysis on customer, product, service, etc. information to determine best target customer segments. Further details of designing a marketing campaign are provided below in connection with FIG. 7.

List generation logic 430 may include any hardware and/or software based logic (e.g., processing logic 220) that enables campaign management server 120 to generate one or more customer lists 460 based on customer data 370 and/or campaign information 380 (e.g., received from campaign design logic 420). Customer lists 460 may include lists of customers that may be targeted by campaign information 380 and may be associated with customer data 370. In one implementation, list generation logic 430 may provide customer data 370, campaign information 380, and/or customer lists 460 to user device 110, vendor system 340, and/or email system 350 for implementation, as described above in connection with FIG. 3.

Although FIG. 4 shows exemplary functional components of campaign management server 120, in other implementations, campaign management server 120 may contain fewer, different, or additional functional components than depicted in FIG. 4. In still other implementations, one or more functional components of campaign management server 120 may perform one or more other tasks described as being performed by one or more other functional components of campaign management server 120.

Figure 5:
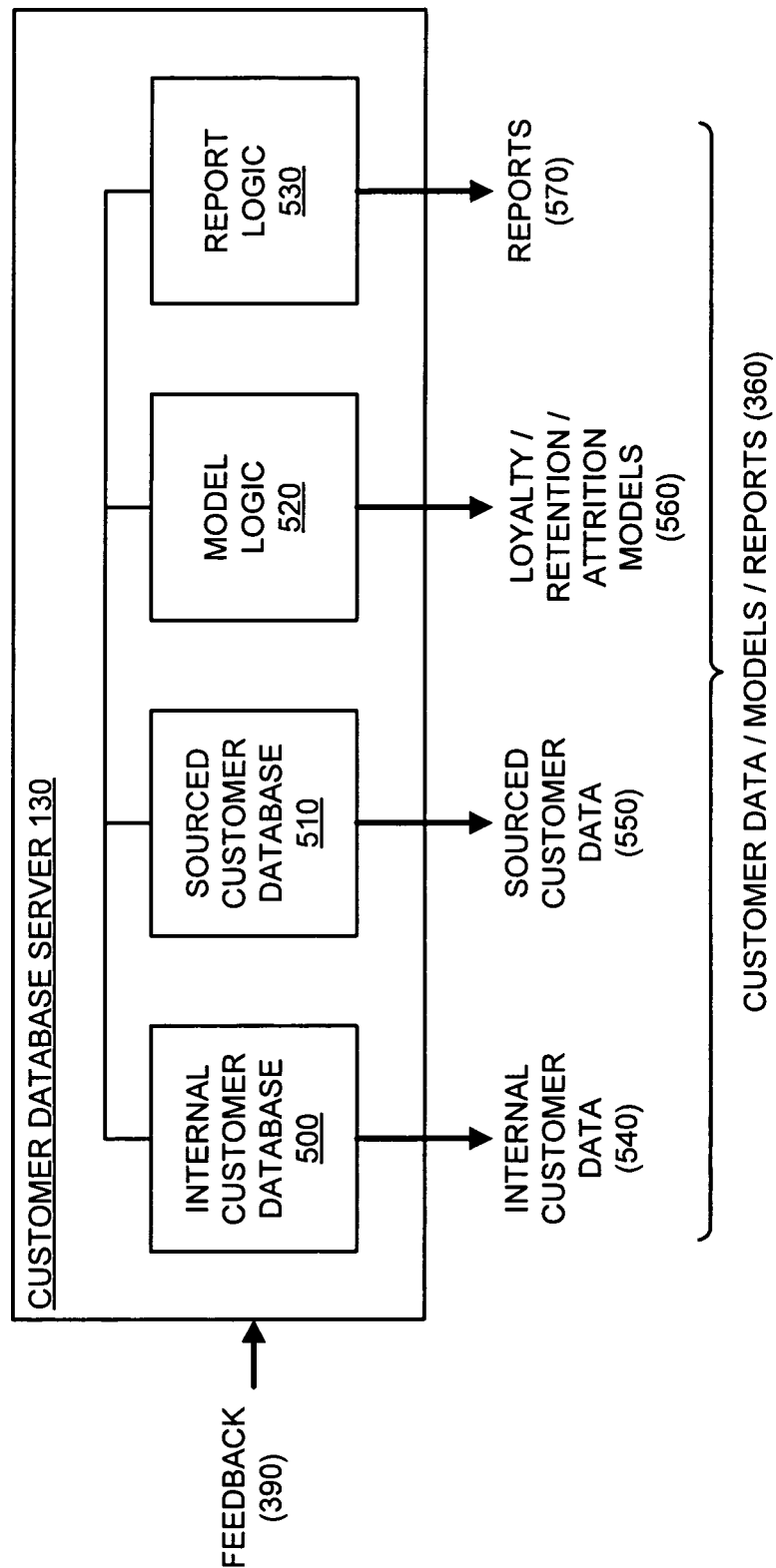
FIG. 5 illustrates an exemplary functional block diagram of the customer database server of the network illustrated in FIG. 1.

FIG. 5 illustrates an exemplary functional block diagram of customer database server 130. As illustrated, customer database server 130 may include an internal customer database 500, a sourced customer database 510, model logic 520, and report logic 530. The functions described in FIG. 5 may be performed by one or more of the exemplary components of device 200 depicted in FIG. 2.

Internal customer database 500 may include a database capable of being provided in customer database server 130 (e.g., within storage device 250) and/or managed by customer database server 130. The information provided in internal customer database 500 may be provided by any device in network 100, and/or by any device provided in a network separate from network 100. Internal customer database 500 may include a variety of information, such as internal customer data 540 associated with existing and/or potential customers (e.g., customer data that may be internal to an organization offering products and/or services).

Sourced customer database 510 may include a database capable of being provided in customer database server 130 (e.g., within storage device 250) and/or managed by customer database server 130. The information provided in sourced customer database 510 may be provided by any device in network 100, and/or by any device provided in a network separate from network 100. Sourced customer database 510 may include a variety of information, such as sourced customer data 550 associated with existing and/or potential customers (e.g., customer data that may received from a source external to an organization offering products and/or services).

Model logic 520 may include any hardware and/or software based logic (e.g., processing logic 220) that enables customer database server 130 to provide one or more models associated with customers. In one implementation, model logic 520 may provide a customer loyalty model (e.g., a model that may provide an indication of customer loyalty to products and/or services), a customer retention model (e.g., a model that may provide an indication of repeat customers of products and/or services), and/or a customer attrition model (e.g., a model that may provide an indication of which customers may stop buying products and/or services, may score and rank customers based on their likelihood to churn, and may identify targeted retention efforts, etc.). Model logic 520 may output loyalty, retention, and/or attrition models 560 to campaign management server 120 and/or to report logic 530.

Report logic 530 may include any hardware and/or software based logic (e.g., processing logic 220) that enables customer database server 130 to provide one or more reports 570 associated with customers. In one implementation, report logic 530 may receive loyalty/retention/attrition models 560, and may generate reports 570 based on models 560. Reports 570 may include an identification of most valuable customers and how to treat them (e.g., may identify how much to spend to retain the most valuable customers, effective methods for retaining such customers, etc.), an identification of opportunities and tactics to increase customer retention (e.g., may identify customer retention rates, whether desirable customers are being retained, at risk customers, etc.), and an identification of "up-sell" (e.g., a marketing term for the practice of suggesting higher priced products or services to a customer who is considering a purchase) and "cross-sell" (e.g., a marketing term for the practice of suggesting related products or services to a customer who is considering buying something) opportunities (e.g., may identify which products represent the best opportunities for cross-sell). Report logic 530 may output reports 570 to customer management server 120.

As further shown in FIG. 5, customer database server 130 may receive customer feedback 390. Customer database server 130 may utilize feedback 390 to update information contained in internal customer database 500 and/or sourced customer database 510, to update models 560, and/or to update reports 570. Internal customer data 540, sourced customer data 550, models 560, and reports 570 may be collectively referred to as customer data/models/reports 360.

Although FIG. 5 shows exemplary functional components of customer database server 130, in other implementations, customer database server 130 may contain fewer, different, or additional functional components than depicted in FIG. 5. In still other implementations, one or more functional components of customer database server 130 may perform one or more other tasks described as being performed by one or more other functional components of customer database server 130.

Figure 6:
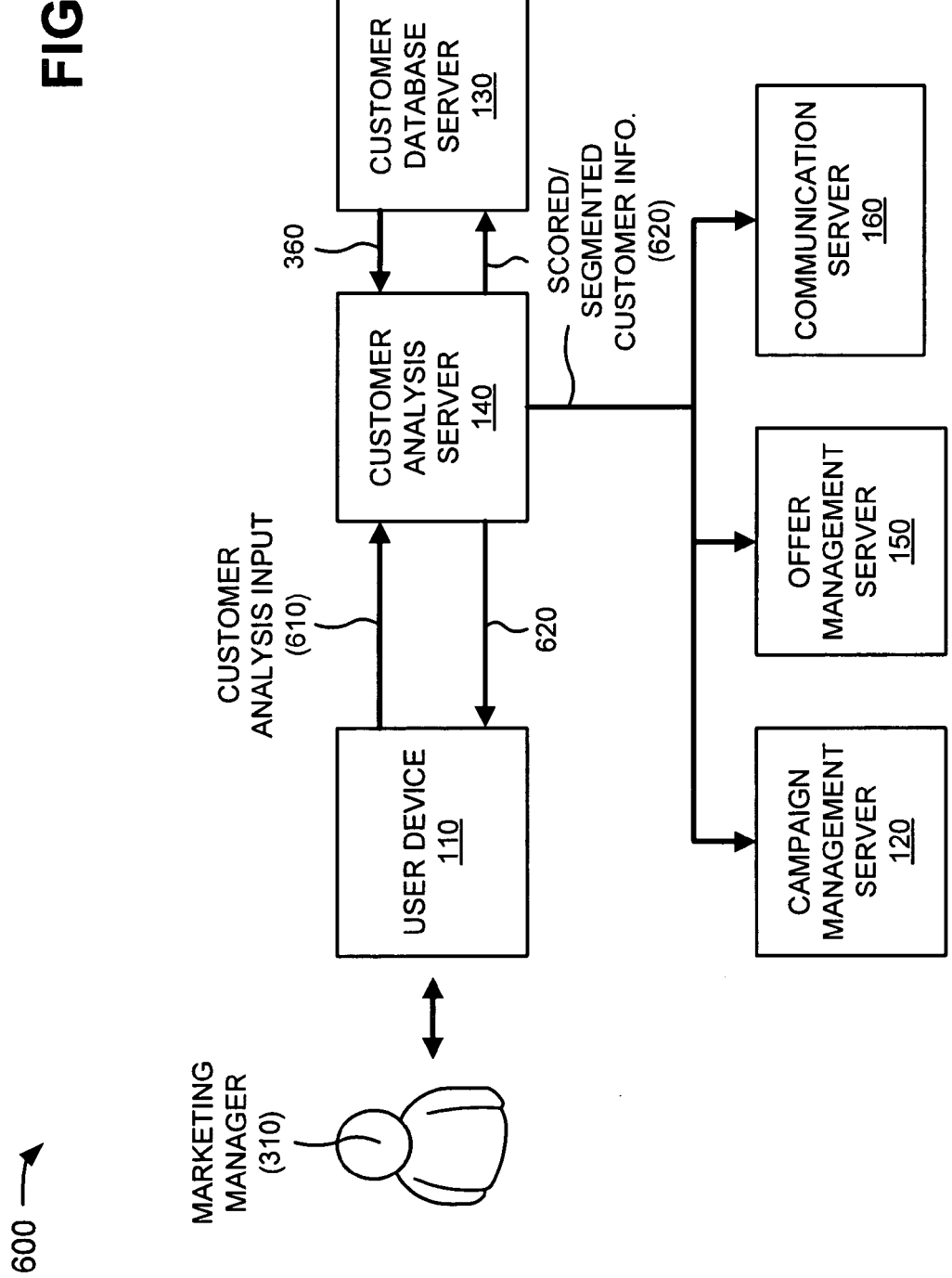
FIG. 6 depicts exemplary interactions between the user device, the customer analysis server, the customer database server, the campaign management server, the offer management server, and the communication server of the network illustrated in FIG. 1.

FIG. 6 depicts a portion 600 of network 100 (that includes user device 110, campaign management server 120, customer database server 130, customer analysis server 140, offer management server 150, and communication server 160), and exemplary interactions between user device 110 and servers 120-160. As illustrated, user device 110 may communicate with marketing manager 310 (e.g., a user of user device 110), and customer analysis server 140 may communicate with user device 110, campaign management server 120, customer database server 130, offer management server 150, and/or communication server 160.

Marketing manager 310 may interact with customer analysis server 140 (e.g., via user device 110) to provide customer analysis input 610 (e.g., how to segment customers, how to score customers, etc.) to customer analysis server 140. Customer database server 130 may provide internal and/or sourced customer data, customer models, and/or customer reports (e.g., customer data/models/reports 360) to customer analysis server 140. Customer analysis server 140 may use customer analysis input 610 and/or customer data/models/reports 360 to manage and/or generate scored and segmented customer information 620 (e.g., customer data/models/reports 360 that has been segmented and scored based on an assumption that customer preferences naturally cluster into groups (i.e., customers belonging to the same group may have similar preferences for product/service selection)). Customer analysis server 140 may provide scored/segmented customer information 620 to user device 110 (e.g., for display to marketing manager 310), campaign management server 120, offer management server 150, and communication server 160. Campaign management server 120 and offer management server 150 may utilize scored/segmented customer information 620 in a manner described herein. Communication server 160 may provide scored/segmented customer information 620 to other marketing managers 310 for review.

Although FIG. 6 shows exemplary components of network portion 600, in other implementations, network portion 600 may contain fewer, different, or additional components than depicted in FIG. 6. In still other implementations, one or more components of network portion 600 may perform one or more other tasks described as being performed by one or more other components of network portion 600.

Figure 7:
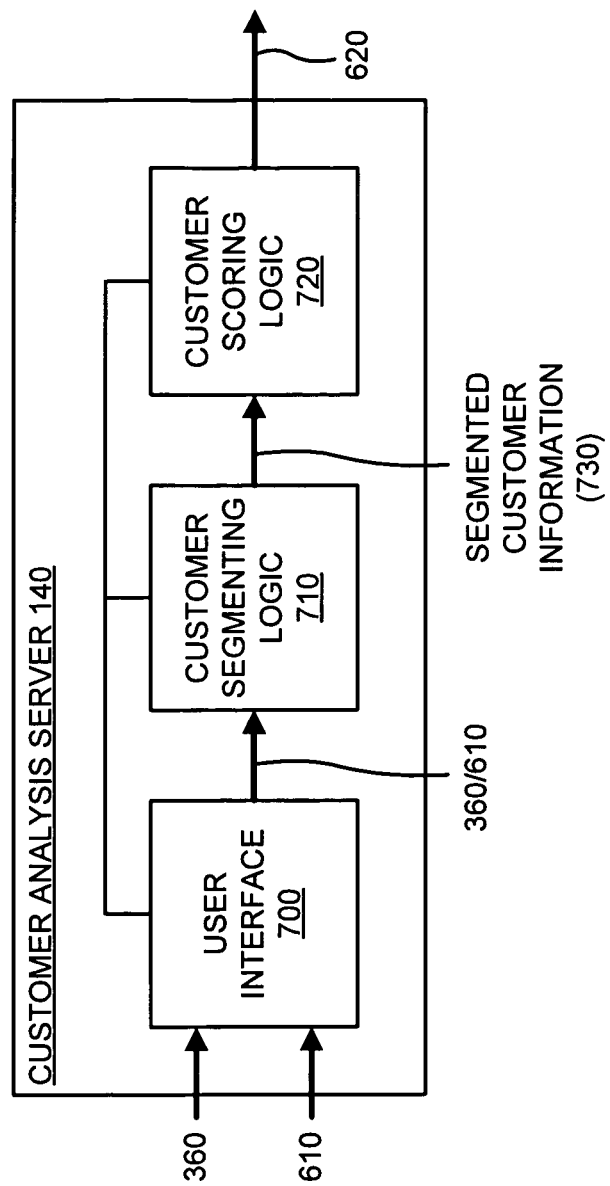
FIG. 7 illustrates an exemplary functional block diagram of the customer analysis server of the network depicted in FIG. 1.

FIG. 7 depicts an exemplary functional diagram of customer analysis server 140. As illustrated, customer analysis server 140 may include a user interface 700, customer segmenting logic 710, and customer scoring logic 720. The functions described in FIG. 7 may be performed by one or more of the exemplary components of device 200 depicted in FIG. 2.

User interface 700 may include a graphical user interface (GUI) or a non-graphical user interface, such as a text-based interface. User interface 700 may provide information to users (e.g., marketing manager 310) via a customized interface (e.g., a proprietary interface) and/or other types of interfaces (e.g., a browser-based interface). User interface 700 may receive user inputs via one or more input devices (e.g., input device 260), may be user configurable (e.g., a user may change the size of user interface 700, information displayed in user interface 700, color schemes used by user interface 700, positions of text, images, icons, windows, etc., in user interface 700, etc.), and/or may not be user configurable. User interface 700 may be displayed to a user via one or more output devices (e.g., output device 270). In one implementation, as shown in FIG. 7, user interface 700 may receive customer data/models/reports 360 (e.g., from customer database server 130) and customer analysis input 610 (e.g., via inputs to user device 110 from marketing manager 310), and may provide customer data/models/reports 360 and customer analysis input 610 to customer segmenting logic 710.

Customer segmenting logic 710 may include any hardware and/or software based logic (e.g., processing logic 220) that enables customer analysis server 140 to determine segmented customer information 730 based on customer data/models/reports 360 and customer analysis input 610. Segmented customer information 730 may include customer information (e.g., customer names, addresses, etc.) segmented based on an assumption that customer preferences naturally cluster into groups (i.e., customers belonging to the same group may have similar preferences for product/service selection). Customers in each segment may agree on what they value, which may increase chances that a product and/or service may appeal to all customers in a segment. Segmented customer information 730 may identify groups of customers (e.g., segments) that are similar such that a similar product and/or service may appeal to all customers in each segment. In one implementation, customer segmenting logic 710 may segment customer information into groups of customers that are similar in specific ways relevant to marketing, such as age, gender, interests, spending habits, etc. For example, customer segmenting logic 710 may identify customer groups based on demographics and attributes (e.g., customer attitude and psychological profiles), value (e.g., review groups of customers in terms of revenue they generate and costs of establishing and maintaining relationships with them), etc. Customer segmenting logic 710 may decide what customer data will be collected and how it will be gathered, may collect and integrate data from various sources, may utilize methods of data analysis for segmentation, may implement applications to effectively deal with the data and respond to the information it provides.

Customer scoring logic 720 may include any hardware and/or software based logic (e.g., processing logic 220) that enables customer analysis server 140 to score segmented customer information 730. In one implementation, customer scoring logic 720 may produce information (e.g., scored/segmented customer information 620) associated with customer segments that may be assigned values or scores (e.g., based on a likelihood of a product and/or a service being sold to one or more customer segments). Scored/segmented customer information 620 may enable targeting of a customer segment (e.g., where customers may agree on what they value, scored/segmented customer information 620 may increase chances that a product and/or service may succeed and may connect with the target customers). Customer scoring logic 720 may provide scored/segmented customer information 620 to user device 110 (e.g., for display to marketing manager 310), campaign management server 120, customer database server 130 (e.g., for storage), offer management server 150, and/or communication server 160.

Although FIG. 7 shows exemplary functional components of customer analysis server 140, in other implementations, customer analysis server 140 may contain fewer, different, or additional functional components than depicted in FIG. 7. In still other implementations, one or more functional components of customer analysis server 140 may perform one or more other tasks described as being performed by one or more other functional components of customer analysis server 140.

Figure 8:
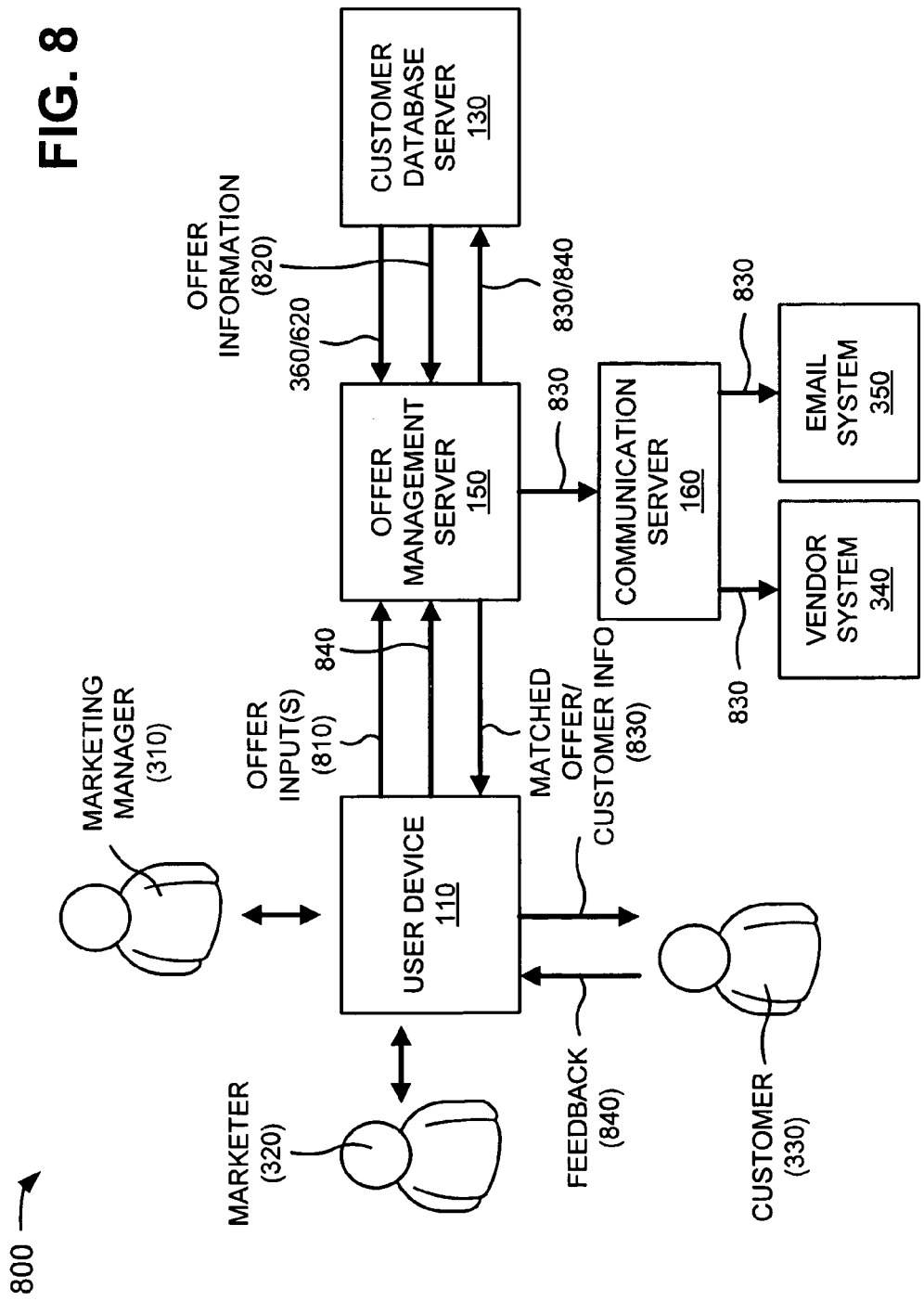
FIG. 8 depicts exemplary interactions between the user device, the offer management server, the customer database server, and the communication server of the network illustrated in FIG. 1.

FIG. 8 depicts a portion 800 of network 100 (that includes user device 110, customer database server 130, offer management server 150, and communication server 160), and exemplary interactions between user device 110, customer database server 130, offer management server 150, and communication server 160. As illustrated, user device 110 may communicate with marketing manager 310 (e.g., a user of user device 110), marketer 320 (e.g., a user of user device 110), and/or customer 330. As further illustrated in FIG. 8, offer management server 150 may communicate with vendor system 340 and/or email system 350 via communication server 160.

Marketing manager 310 may interact with offer management server 150 (e.g., via user device 110) to manage, match, filter, and/or prioritize credit and product/service offers available to customers. For example, marketing manager 310 may input offer input(s) 810 (e.g., products to offer, services to offer, prices of products, prices of services, etc.) via user device 110. Marketer 320 may interact with offer management server 140 (e.g., via user device 110) to access one or more credit and product/service offers. In such instances, user device 110 may operate as an outbound calling module, an outbound email module, a device capable of autodialing a telephone number, etc.

As further shown in FIG. 8, customer database server 130 may provide customer data/models/reports 360, scored/segmented customer information 620, and/or offer information 820 (e.g., product(s) and service(s) to offer in a bundle, credit and product/service bundles, prices of products, prices of services, products and/or services to offer, etc.) to offer management server 150. Offer management server 150 may use customer data/models/reports 360, scored/segmented customer information 620, and/or offer information 820 to match customer information (e.g., customer names, addresses, telephone numbers, personal information, company information, etc.) with offer information 820, and to generate matched offer/customer information 830. Matched offer/customer information 830 may include system defined rules and user defined rules associated with one or more offers (e.g., rules that define what products and/or service to offer a particular customer and when to offer such products and/or services). In one example, the system defined rules may include rules provided by marketing manager 310 (e.g., via offer inputs 810). In another example, the user defined rules may be based on a customer's profile, churn score (e.g., likelihood to cease purchasing a product and/or service), credit history, treatment history, current account products and/or services, market intelligence, etc.

Offer management server 150 may provide matched offer/customer information 830 to user device 110, customer database server 130, and communication server 160. Customer database server 130 may store matched offer/customer information 830. Communication server 160 may provide matched offer/customer information 830 to vendor system 340 and/or email system 350. Vendor system 340 and/or email system 350 may distribute offers (e.g., contained in matched offer/customer information 830) to customers (e.g., contained in matched offer/customer information 830), via telephone, email, direct mail, etc.

User device 110 (e.g., with or without marketer 320) may convey one or more offers contained in matched offer/customer information 830 to customer 330, and may receive feedback 840 (e.g., customer interest in one or more offers, etc.) about the one or more offers from customer 330. In one example, user device 110 may email the one or more offers to customer 330. In another example, user device 110 may be used by marketer 320 to contact customer 330 and to convey the one or more offers to marketer 320 while marketer 320 verbally interacts with customer 330 (e.g., a telemarketing arrangement). User device 110 may provide feedback 840 to offer management server 150, and offer management server 150 may provide feedback 840 to customer database server 130. Offer management server 150 may also update matched offer/customer information 830 based on the received feedback 830, and may provide the updated matched offer/customer information 830 to customer database server 130.

With such an arrangement, a customer service representative may be free to interact and connect with a customer rather than being involved in a long and complicate check list (e.g., formerly provided by M&P documents). Offer management server 150 may automate the entire offer management and training process, and may replace the manual, error-prone offer management process (e.g., with M&P documents) described above. Offer management server 150 may make it easier to manage offers, and may reduce an average handling time per customer since the offer/customer information matching may occur almost instantaneously and may be presented to the customer service representative in real time and in order of priority.

Although FIG. 8 shows exemplary components of network portion 800, in other implementations, network portion 800 may contain fewer, different, or additional components than depicted in FIG. 8. In still other implementations, one or more components of network portion 800 may perform one or more other tasks described as being performed by one or more other components of network portion 800.

Figure 9:
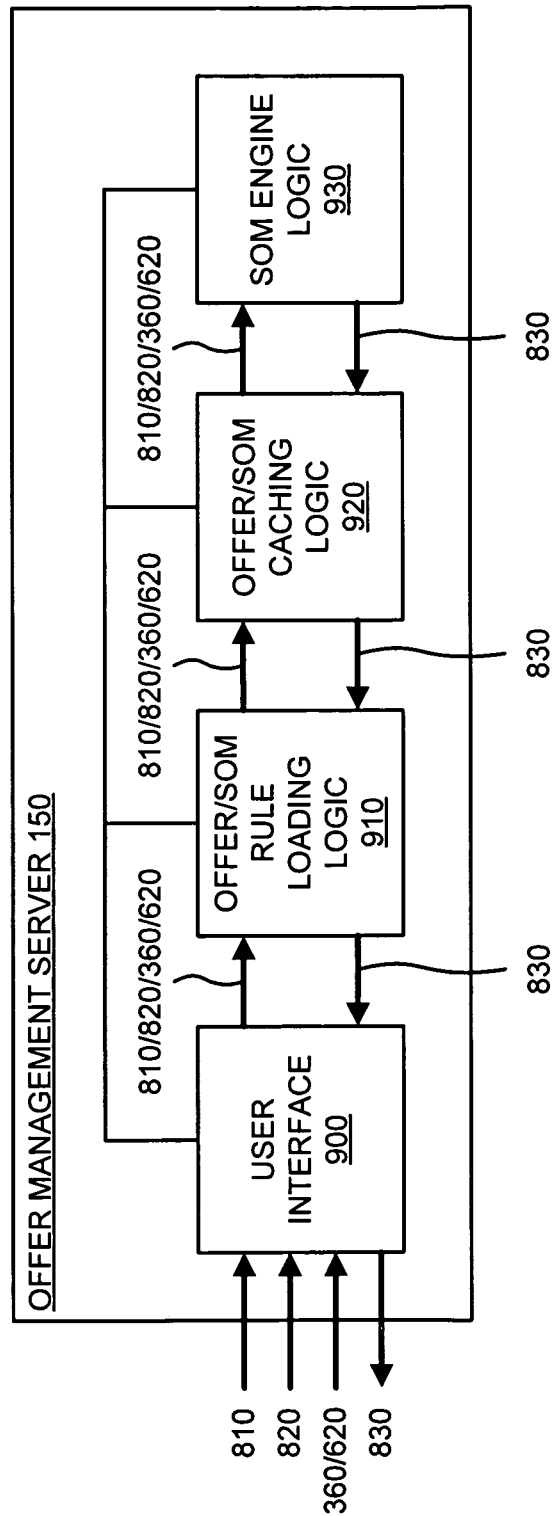
FIG. 9 illustrates an exemplary functional block diagram of the offer management server of the network depicted in FIG. 1.

FIG. 9 depicts an exemplary functional diagram of offer management server 150. As illustrated, offer management server 150 may include a user interface 900, offer/situation offer matrix (SOM) rule loading logic 910, offer/SOM caching logic 920, and SOM engine logic 930. The functions described in FIG. 9 may be performed by one or more of the exemplary components of device 200 depicted in FIG. 2.

User interface 900 may include a graphical user interface (GUI) or a non-graphical user interface, such as a text-based interface. User interface 900 may provide information to users (e.g., marketing manager 310, marketer 320, etc.) via a customized interface (e.g., a proprietary interface) and/or other types of interfaces (e.g., a browser-based interface). User interface 900 may receive user inputs via one or more input devices (e.g., input device 260), may be user configurable (e.g., a user may change the size of user interface 900, information displayed in user interface 900, color schemes used by user interface 900, positions of text, images, icons, windows, etc., in user interface 900, etc.), and/or may not be user configurable. User interface 900 may be displayed to a user via one or more output devices (e.g., output device 270). In one implementation, as shown in FIG. 9, user interface 900 may receive offer input(s) 810 (e.g., via inputs to user device 110 from marketing manager 310), customer data/models/reports 360, scored/segmented customer information 620, and offer information 820 (e.g., via customer database server 130), and/or feedback 840 (e.g., via user device 110).

Offer/SOM rule loading logic 910 may include any hardware and/or software based logic (e.g., processing logic 220) that enables offer management server 150 to load offers from source tables (e.g., accessible to marketing manager 310) based on offer input(s) 810, customer data/models/reports 360, scored/segmented customer information 620, offer information 820, and/or feedback 840. Offer/SOM rule loading logic 910 may make the offers available to marketer 320 (e.g., via user interface 900) so that the offers may be used to serve customers. In one example, offer/SOM rule loading logic 910 may select an offer from a group of offers (e.g., provided in source tables), and may update the offer (e.g., based on offer input(s) 810, customer data/models/reports 360, scored/segmented customer information 620, offer information 820, and/or feedback 840) or may create a new offer (e.g., if the offer does not exist). Offer/SOM rule loading logic 910 may receive one or more sales codes associated with the selected offer, and may create a system situation (e.g., customer has Internet, telephone, and television services and calls to disconnect the Internet service but wants to keep their telephone service) based on the selected offer and the one or more sales codes. Offer/SOM rule loading logic 910 may generate offer information (e.g., offer customer additional $10.00 savings for six months on Internet service) based on the selected offer, the one or more sales codes, and the system situation. If an offer expires in the master offer table, offer/SOM rule loading logic 910 may automatically disable any situations associated with the expired offer.

Offer/SOM caching logic 920 may include any hardware and/or software based logic (e.g., processing logic 220) that enables offer management server 150 to design enhance the speed of offer retrieval, matching, etc. In one implementation, offer/SOM caching logic 920 may receive offer input(s) 810, customer data/models/reports 360, scored/segmented customer information 620, offer information 820, feedback 840, and/or offers loaded by offer/SOM rule loading mechanism 910, and may input this information into a database provided in memory of offer management server 150 (or another server). The database may serve as a fast in-memory (e.g., cache-based) database that may further enhance the speed of offer retrieval, matching, etc.

SOM engine logic 930 may include any hardware and/or software based logic (e.g., processing logic 220) that enables offer management server 150 to read available offers and pre-defined situations (e.g., from server cache), and to perform a matching process based on defined rules (e.g., system defined rules and/or user defined rules). In one implementation, SOM engine logic 930 may receive offer input(s) 810, customer data/models/reports 360, scored/segmented customer information 620, offer information 820, feedback 840, and/or offers loaded by offer/SOM rule loading mechanism 910 from offer/SOM caching logic 920 and may perform the matching process based on the defined rules to generate matched offer/customer information 830. The rules may be categorized into two types, i.e., system defined rules (or situations) and user defined rules (or situations). For each offer in a master offer table, a corresponding system defined rule may be automatically created by offer/SOM rule loading mechanism 910 and stored in a SOM rule database (e.g., in storage device 250 of offer management server 150). SOM engine logic 930 may convert M&P documents into user defined rules, and may store the user defined rules in the SOM rule database. The user defined rules may include rules based on customer profile, customer churn score, customer credit history, customer treatment history (e.g., customer experienced service problems in the past), current products or services in a customer account, market intelligence, etc. SOM engine logic 930 may assign the user defined rules higher priorities than the system defined rules. SOM engine logic 930 may ensure that no two situations are the same to prevent duplicates, and may track offers extended to customers so that such offers are not duplicated to the same customers.

In another implementation, SOM engine logic 930 may select an offer from a group of offers based on customer information (e.g., customer data/models/reports 360 and/or scored/segmented customer information 620), and may retrieve a system situation (e.g., customer has Internet, telephone, and television services and calls to disconnect the Internet service but wants to keep their telephone service) associated with the selected offer. SOM engine logic 930 may determine if a customer qualifies for the system situation associated with the selected offer. If the customer does not qualify for the system situation, SOM engine logic 930 may select another offer from the group of offers. If the customer does qualify for the system situation, SOM engine logic 930 may add the selected offer to matched offer/customer information 830. Such an arrangement may match one or more offers to a particular customer based on existing conditions (e.g., a customer profile) and dynamic conditions (e.g., the customer's situation at a time of interaction with the customer service representative).

SOM engine logic 930 may also enable handling of customers through speech recognition and/or interactive voice response (IVR) systems, which may provide further savings. For example, the speech recognition/IVR systems may conduct a short subjective survey with the customer, and may forward the customer to a queue. SOM engine logic 930 may automatically determine the intent of a call based on survey responses, and may factor in survey responses in determining an offer to extend. The customer service representative may initiate a dialog with the customer, and may extend the offer to the customer.

Although FIG. 9 shows exemplary functional components of offer management server 150, in other implementations, offer management server 150 may contain fewer, different, or additional functional components than depicted in FIG. 9. In still other implementations, one or more functional components of offer management server 150 may perform one or more other tasks described as being performed by one or more other functional components of offer management server 150.

Figure 10:
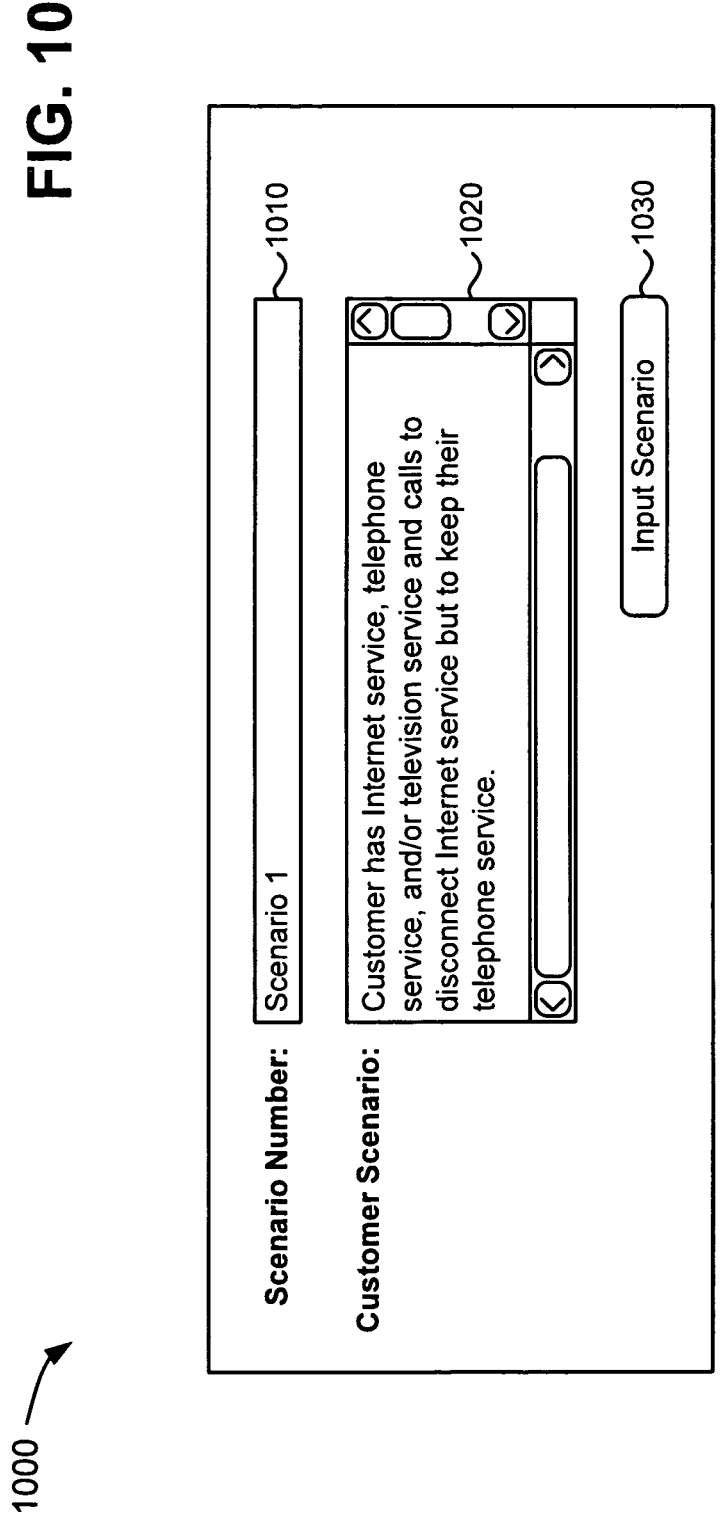
FIGS. 10 and 11 depict exemplary user interfaces capable of being provided by the offer management server of the network illustrated in FIG. 1.
Figure 11:
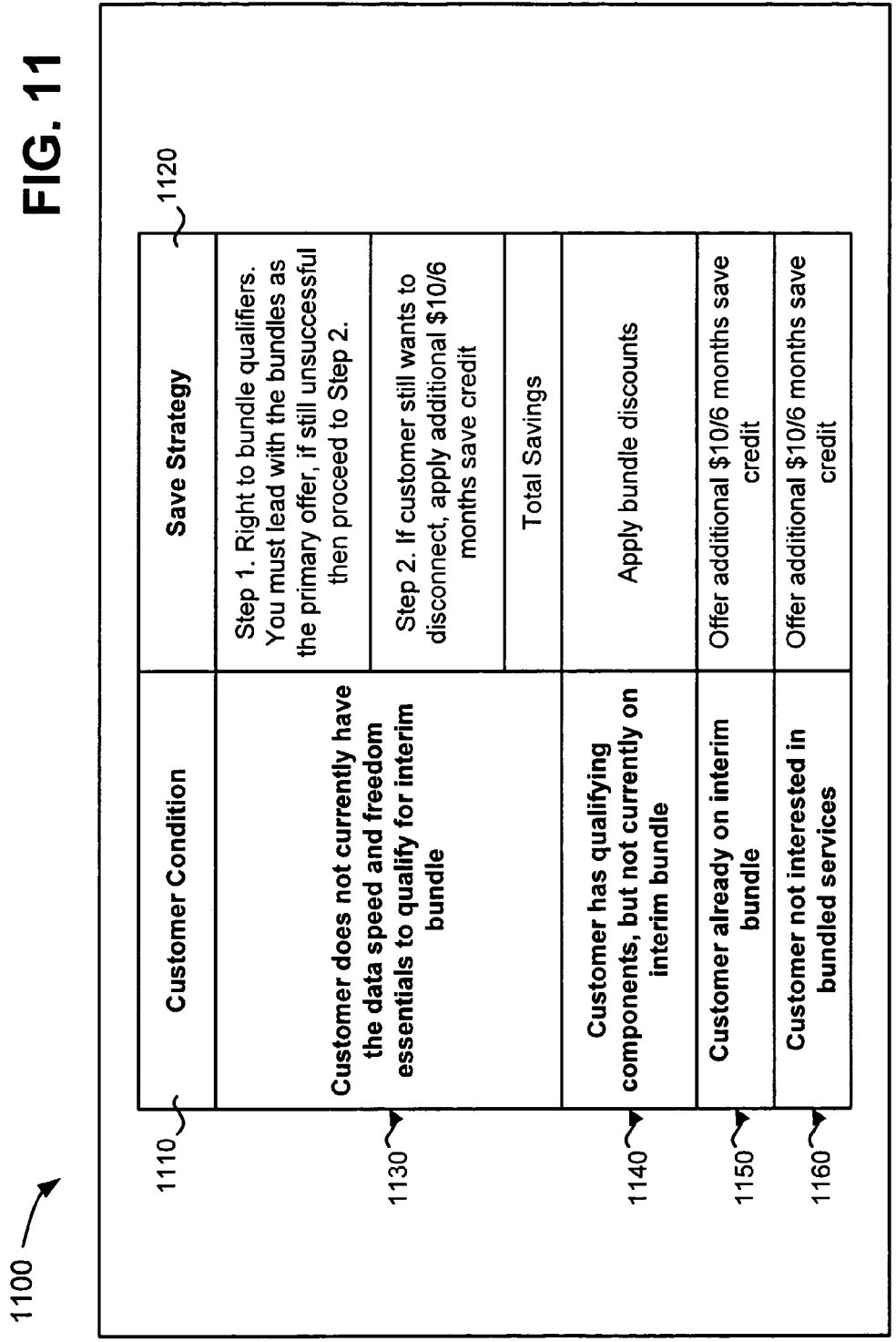

FIGS. 10 and 11 depict exemplary user interfaces 1000 and 1100 that may be provided by offer management server 150 (e.g., via user interface 900). In one implementation, user interfaces 1000 and 1100 may display a variety of information capable of being provided by the offer management application of offer management server 150 (e.g., to user device 110). In one example, the variety of information may be generated and provided (e.g., via email, directly, via a download, etc.) to a user of user device 110 with a single selection mechanism (e.g., a single click of a mouse).

If a user (e.g., a customer service representative) executes the offer management application (e.g., via user device 110), a user interface 1000 (e.g., customer scenario input), as shown in FIG. 10, may be displayed to the user. As illustrated, user interface 1000 may include a variety of information associated with customer scenario input. In one implementation, user interface 1000 may include a scenario number input field 1010, a customer scenario input field 1020, and/or a scenario input mechanism 1030.

Scenario number input field 1010 may include a field that enables a user to input a scenario number associated with the customer scenario defined in user interface 1000. For example, scenario number input field 1010 may include an input field (e.g., for typing a scenario number, such as "Scenario 1"), a drop-down menu (e.g., for selecting a scenario number from a list of scenario numbers), and/or other types of input mechanisms.

Customer scenario input field 1020 may include a field that enables a user to input descriptive information associated with the customer scenario defined in user interface 1000. For example, customer scenario input field 1020 may include an input field (e.g., for typing descriptive information, such as "Customer has Internet service, telephone service, and/or television service and calls to disconnect Internet service but to keep their telephone service."), a drop-down menu (e.g., for selecting descriptive customer scenario information from a list of customer scenario information), and/or other types of input mechanisms.

Scenario input mechanism 1030 may include a mechanism (e.g., a button, an icon, a link, etc.) that, if selected (e.g., with a selection mechanism, such as a mouse), may enable the user to create the customer scenario described in customer scenario input field 1020. If the user selects scenario input mechanism 1030, the customer scenario described in customer scenario input field 1020 may be provided to offer management server 150.

Although FIG. 10 shows exemplary elements of user interface 1000, in other implementations, user interface 1000 may contain fewer, different, or additional elements than depicted in FIG. 10.

If the user selects scenario input mechanism 1030 (e.g., via user device 110), a user interface 1100 (e.g., a customer interaction process), as shown in FIG. 11, may be displayed to the user (e.g., a customer service representative). As illustrated, user interface 1100 may be generated based on the customer scenario described in customer scenario input field 1020, and may include a variety of information associated with the customer interaction process. In one implementation, user interface 1100 may include a customer condition field 1110, a save strategy field 1120, and a first entry 1130, a second entry 1140, a third entry 1150, and a fourth entry 1160 associated with customer condition field 1110 and save strategy field 1120.

Customer condition field 1110 may include one or more entries that provide customer conditions associated with one or more products and/or one or more services (e.g., being offered by an organization or currently being used by the customer). For example, customer condition field 1110 may provide a customer service representative with a list of customer conditions that may apply to a customer interacting with the customer service representative.

Save strategy field 1120 may include one or more entries that provide save strategies associated with the customer condition entries provided under customer condition field 1110. For example, save strategy field may provide a customer service representative with a list of strategies (e.g., offers) that may be extended to a customer interacting with the customer service representative. Each strategy provided by save strategy field 1120 may correspond with a customer condition provided by customer condition field 1110.

First entry 1130 may provide a first exemplary customer condition, such as "Customer does not currently have the data speed and freedom essentials to qualify for interim bundle." First entry 1130 may provide an associated first exemplary save strategy, such as "Step 1. Right to bundle qualifiers. You must lead with the bundles as the primary offer, if still unsuccessful then proceed to Step 2. Step 2. If customer still wants to disconnect, apply additional $10/6 months save credit. Total Savings." If the customer satisfies the customer condition specified by first entry 1130, the customer service representative may apply the save strategy specified by first entry 1130.

Second entry 1140 may provide a second exemplary customer condition, such as "Customer has qualifying components, but not currently on interim bundle." Second entry 1140 may provide an associated second exemplary save strategy, such as "Apply bundle discounts." If the customer satisfies the customer condition specified by second entry 1140, the customer service representative may apply the save strategy specified by second entry 1140.

Third entry 1150 may provide a third exemplary customer condition, such as "Customer already on interim bundle." Third entry 1150 may provide an associated third exemplary save strategy, such as "Offer additional $10/6 months save credit." If the customer satisfies the customer condition specified by third entry 1150, the customer service representative may apply the save strategy specified by third entry 1150.

Fourth entry 1160 may provide a fourth exemplary customer condition, such as "Customer not interested in bundled services." Fourth entry 1160 may provide an associated fourth exemplary save strategy, such as "Offer additional $10/6 months save credit." If the customer satisfies the customer condition specified by fourth entry 1160, the customer service representative may apply the save strategy specified by fourth entry 1160.

Although FIG. 11 shows exemplary elements of user interface 1100, in other implementations, user interface 1100 may contain fewer, different, or additional elements than depicted in FIG. 11.

Figure 12:
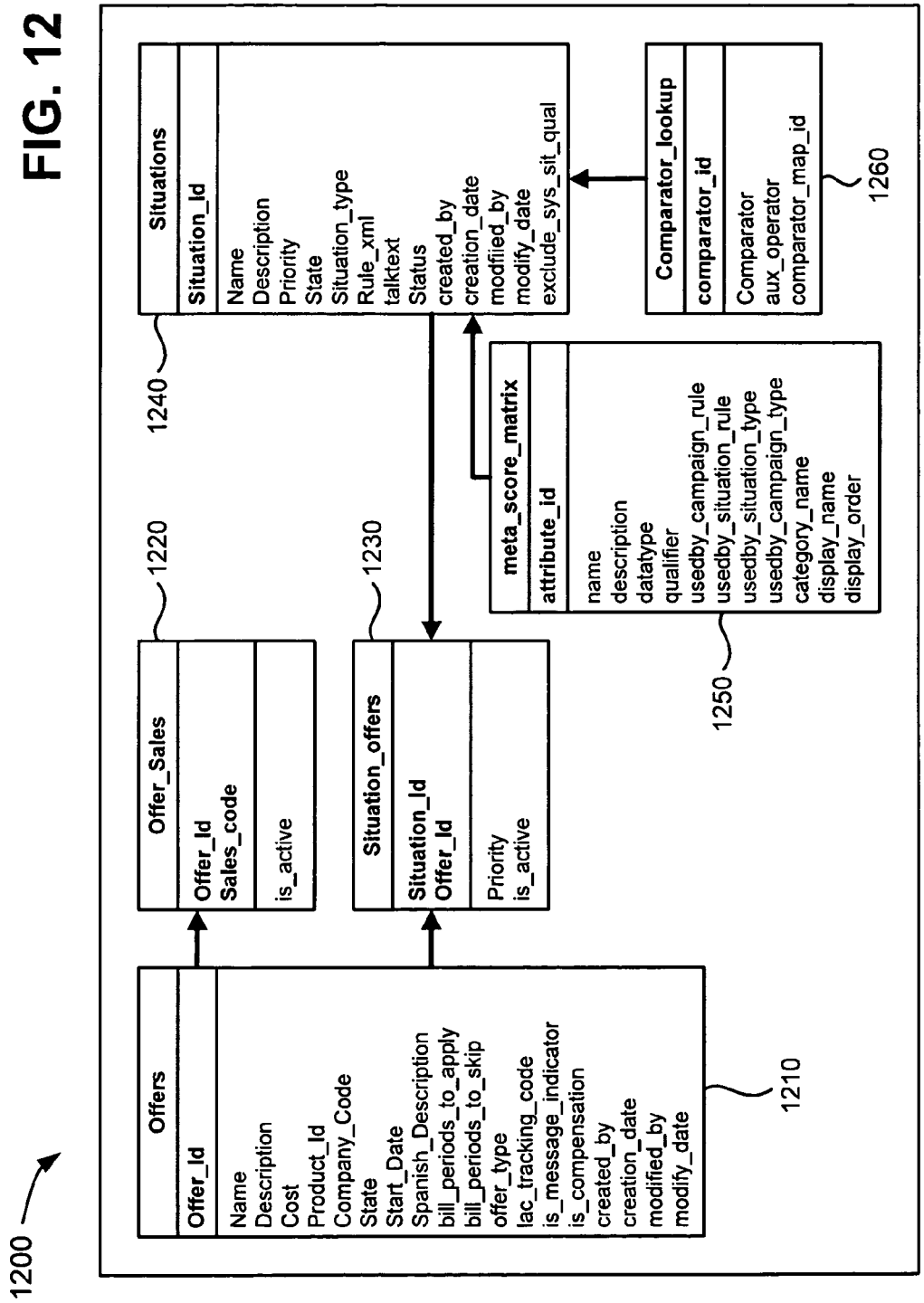
FIG. 12 illustrates a portion of an exemplary database capable of being managed by the offer management server of the network depicted in FIG. 1.

FIG. 12 illustrates a portion 1200 of an exemplary database capable of being provided in offer management server 150 (e.g., within storage device 250) and/or managed by offer management server 150. The information provided in database portion 1200 may be provided by any device in network 100, and may be used by any device of network 100. For example, as described above in connection with FIG. 8, offer management server 150 may receive customer data/models/reports 360, scored/segmented customer information 620, and/or offer information 820. Offer management server 150 may store such information in the exemplary database associated with database portion 1200.

As illustrated, database portion 1200 may include a variety of credit and product/service offer information, such as an offers data table 1210, an offer sales data table 1220, a situation offers data table 1230, a situations data table 1240, a score matrix data table 1250, and/or a comparator lookup data table 1260. As further shown in FIG. 12, one or more of data tables 1210-1260 may interact with one or more other data tables 1210-1260 (e.g., as indicated by the arrows in database portion 1200).

Offers data table 1210 may include a table of information associated with one or more offers of one or more products and/or services. For example, offers data table 1210 may include an offer identifier ("Offer_Id"), an offer name ("Name"), an offer description ("Description"), an offer cost ("Cost"), a product associated with an offer ("Product_Id"), a company associated with an offer ("Company_Code"), a state associated with the offer ("State"), and/or other information associated with the offer (e.g., "Start_Date," "Spanish_Description," "bill_periods_to_apply," "bill_periods_to_skip," "offer_type," "lac_tracking_code," "is_message_indicator," "is_compensation," "created_by," "creation_date," "modified_by," "modify_date," etc.).

Offer sales data table 1220 may include a table of sales code information associated with the offers identified in offers data table 1210. For example, offer sales data table 1220 may include an offer identifier ("Offer_Id"), a sales code associated with the offer ("Sales_code"), and/or a status indication ("is_active") associated with the sales code.

Situation offers data table 1230 may include a table of situation/offer information associated with the offers identified in offers data table 1210. For example, situation offers data table 1230 may include a situation identifier ("Situation_Id"), an offer identifier ("Offer_Id"), a priority associated with the situation/offer ("Priority"), and/or a status indication ("is_active") associated with the situation/offer.

Situations data table 1240 may include a table of situation information associated with the offers identified in offers data table 1210. For example, situations data table 1240 may include a situation identifier ("Situation_Id"), a situation name ("Name"), a situation description ("Description"), a priority associated with the situation ("Priority"), and/or other information associated with the situation (e.g., "State," "Situation_type," "Rule_xml," "talktext," "Status," "created_by," "creation_date," "modfied_by," "modify_date," "exclude_sys_sit_qual," etc.).

Score matrix data table 1250 may include a table of score matrix information associated with the offers identified in offers data table 1210. For example, score matrix data table

1250 may include an attribute identifier ("attribute_id"), an attribute name ("name"), an attribute description ("description"), and/or other score matrix information (e.g., "datatype," "qualifier," "usedby_campaign_rule," "usedby_situation_rule," "usedby_situation_type," "usedby_campaign_type," "category_name," "display_name," "display_order," etc.).

Comparator lookup data table 1260 may include a table of comparator information associated with the offers identified in offers data table 1210. For example, comparator lookup data table 1260 may include a comparator identifier ("comparator_id"), a comparator ("Comparator"), an auxiliary operator ("aux_operator"), and/or a comparator map identifier ("comparator map_id").

Although FIG. 12 shows exemplary information that may be provided in database portion 1200, in other implementations, database portion 1200 may contain fewer, different, or additional information than depicted in FIG. 12.

Figure 13:
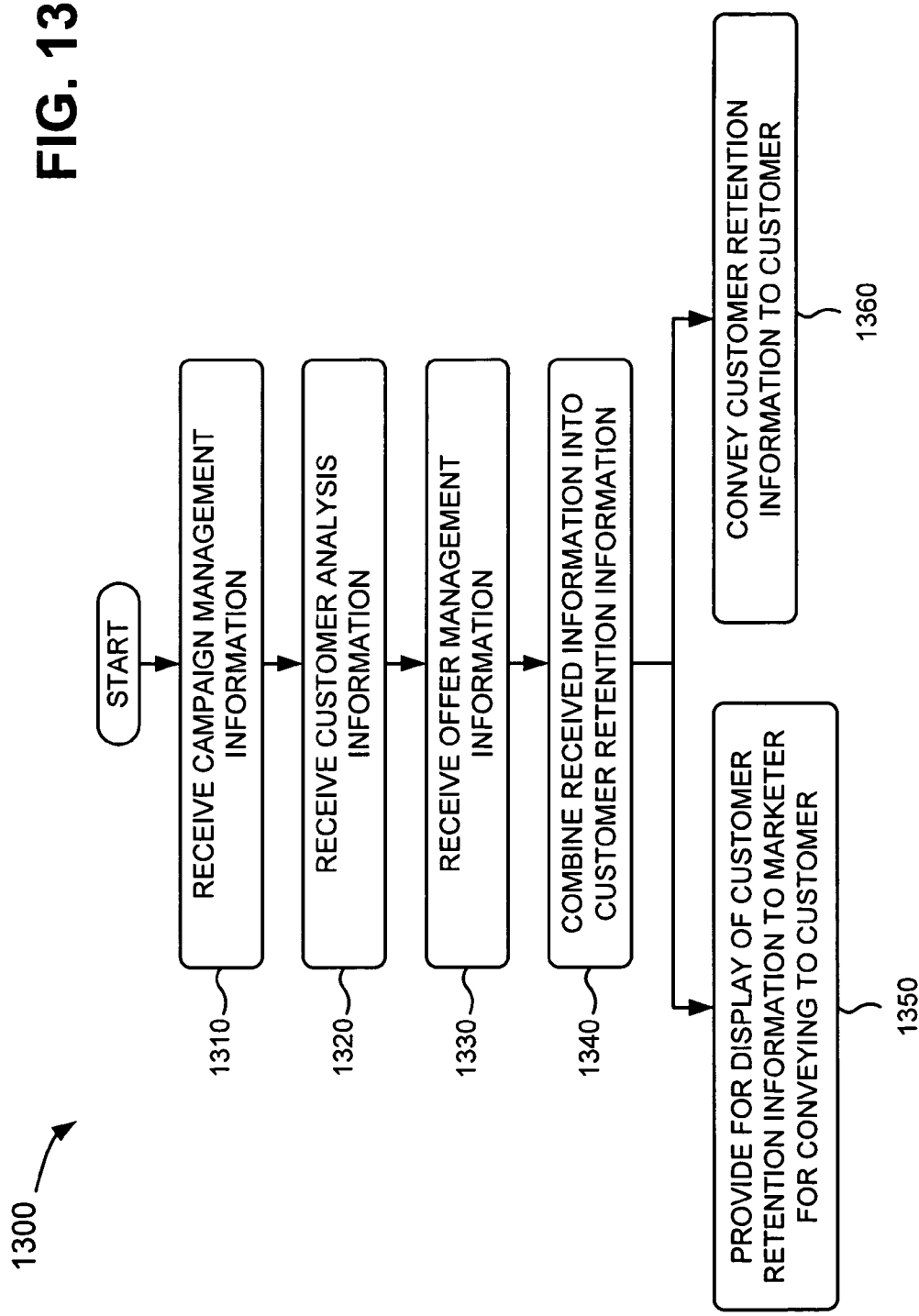

FIG. 13 depicts a flow chart of an exemplary process 1300 for automatically retaining existing customers and/or winning back lost customers according to implementations described herein. In one implementation, process 1300 may be performed by communication server 160. In another implementation, some or all of process 1300 may be performed by another device or group of devices, including or excluding communication server 160.

As illustrated in FIG. 13, process 1300 may begin with receipt of campaign management information (block 1310), customer analysis information (block 1320), and offer management information (block 1330). For example, in implementations described above in connection with FIG. 1, communication server 160 may receive campaign management information (e.g., from campaign management server 120), may receive customer analysis information (e.g., from customer database server 130 and/or customer analysis server 140), and may receive offer management information (e.g., from offer management server 150).

As further shown in FIG. 13, the received campaign management information, customer analysis information, and offer management information may be combined into customer retention information (block 1340), and the customer retention information may be provided for display to a marketer for conveying to a customer (block 1350) and/or may be conveyed to a customer (block 1360). For example, in implementations described above in connection with FIG. 1, communication server 160 may combine the received information (e.g., campaign management information, customer analysis information, and offer management information) into customer retention information (e.g., credit and product/service offers, marketing information, etc. used to retain, attract, win back, etc. customers). Communication server 160 may provide for display of the customer retention information to a marketer (e.g., a customer service representative) for conveying to a customer, and/or may convey the customer retention information to the customer (e.g., via email, direct mail, telephone, etc.).

Figure 14:
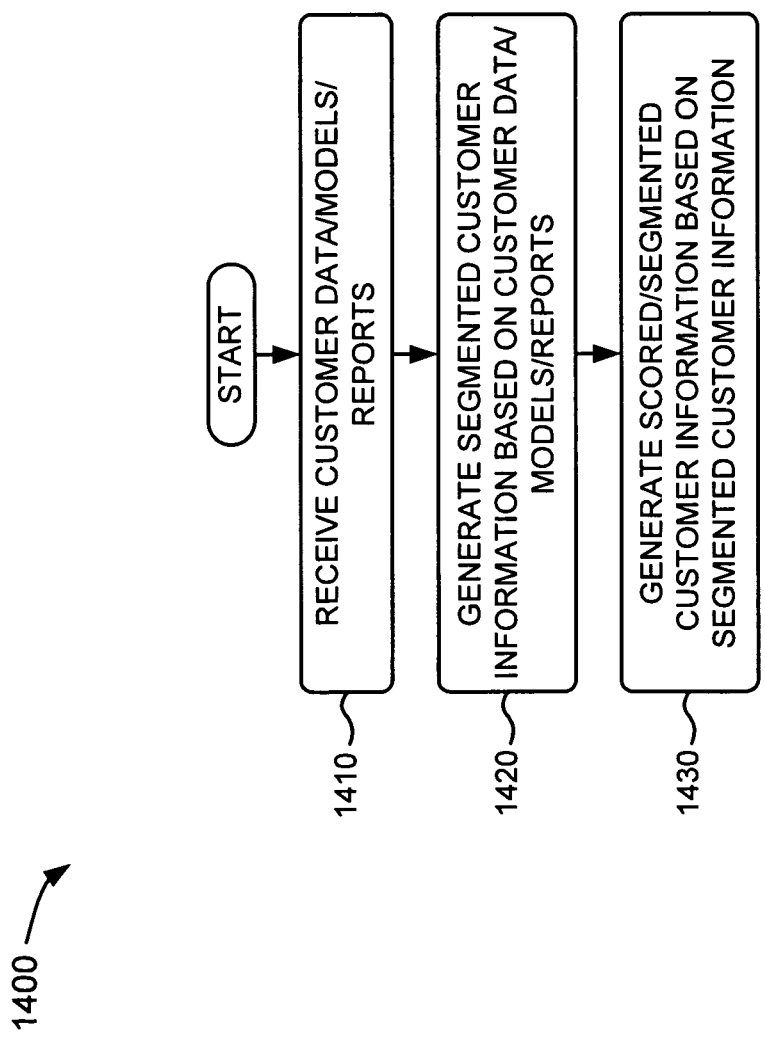

FIG. 14 depicts a flow chart of an exemplary process 1400 for automatically segmenting and scoring customers according to implementations described herein. In one implementation, process 1400 may be performed by customer analysis server 140. In another implementation, some or all of process 1400 may be performed by another device or group of devices, including or excluding customer analysis server 140.

As illustrated in FIG. 14, process 1400 may begin with receipt of customer data, models, and/or reports (block 1410), and generation of segmented customer information based on the customer data, models, and/or reports (block 1420). For example, in implementations described above in connection with FIG. 7, customer segmenting logic 710 of customer analysis server 140 may determine segmented customer information 730 based on customer data/models/reports 360 and customer analysis input 610. Segmented customer information 730 may include customer information (e.g., customer names, addresses, etc.) segmented based on an assumption that customer preferences naturally cluster into groups (i.e., customers belonging to the same group may have similar preferences for product/service selection). In one example, customer segmenting logic 710 may segment customer information into groups of customers that are similar in specific ways relevant to marketing, such as age, gender, interests, spending habits, etc.

As further shown in FIG. 14, scored and segmented customer information may be generated based on the segmented customer information (block 1430). For example, in implementations described above in connection with FIG. 7, customer scoring logic 720 of customer analysis server 140 may produce information (e.g., scored/segmented customer information 620) associated with customer segments that may be assigned values or scores (e.g., based on a likelihood of a product and/or a service being sold to one or more customer segments). Scored/segmented customer information 620 may enable targeting of a customer segment (e.g., where customers may agree on what they value, scored/segmented customer information 620 may increase chances that a product and/or service may succeed and may connect with the target customers).

FIGS. 15-19 depict flow charts of an exemplary process 1500 for automatically managing, matching, filtering, and/or prioritizing credit and product/service offers available to customers according to implementations described herein. In one implementation, process 1500 may be performed by offer management server 150. In another implementation, some or all of process 1500 may be performed by another device or group of devices, including or excluding offer management server 150.

Figure 15:
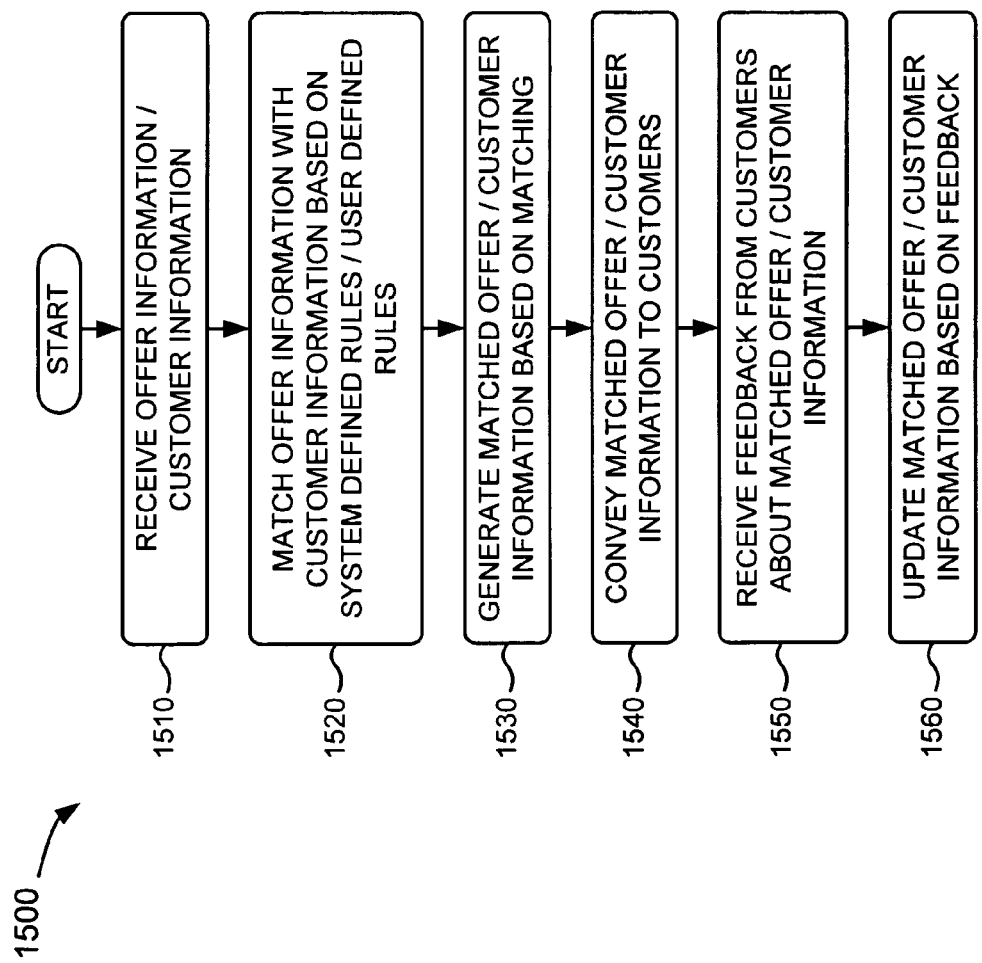

As illustrated in FIG. 15, process 1500 may begin with receipt of offer information and customer information (block 1510), and matching of the offer information with the customer information based on system defined rules and user defined rules (block 1520). For example, in implementations described above in connection with FIG. 8, customer database server 130 may provide customer data/models/reports 360, scored/segmented customer information 620, and/or offer information 820 to offer management server 150. Offer management server 150 may use customer data/models/reports 360, scored/segmented customer information 620, and/or offer information 820 to match customer information (e.g., customer names, addresses, telephone numbers, personal information, company information, etc.) with offer information 820.

As further shown in FIG. 15, matched offer and customer information may be generated based on the matching (block 1530), and the matched offer/customer information may be conveyed to customers (block 1540). For example, in implementations described above in connection with FIG. 8, offer management server 150 may generate matched offer/customer information 830. Matched offer/customer information 830 may include system defined rules and user defined rules associated with one or more offers (e.g., rules that define what products and/or service to offer a particular customer and when to offer such products and/or services). Offer management server 150 may provide matched offer/customer information 830 to user device 110 and communication server 160. Communication server 160 may provide matched offer/customer information 830 to vendor system 340 and/or email system 350. Vendor system 340 and/or email system 350 may distribute offers (e.g., contained in matched offer/customer information 830) to customers (e.g., contained in matched offer/customer information 830), via telephone, email, direct mail, etc. User device 110 (e.g., with or without marketer 320) may convey one or more offers contained in matched offer/customer information 830 to customer 330. In one example, user device 110 may email the one or more offers to customer 330. In another example, user device 110 may be used by marketer 320 to contact customer 330 and to convey the one or more offers to marketer 320 while marketer 320 verbally interacts with customer 330 (e.g., a telemarketing arrangement).

Returning to FIG. 15, feedback may be received from the one or more customers about the matched offer/customer information (block 1550), and the matched offer/customer information may be updated based on the feedback (block 1560). For example, in implementations described above in connection with FIG. 8, user device 110 (e.g., with or without marketer 320) may receive feedback 840 (e.g., customer interest in one or more offers, etc.) about the one or more offers from customer 330. User device 110 may provide feedback 840 to offer management server 150, and offer management server 150 may update matched offer/customer information 830 based on the received feedback 830, and may provide the updated matched offer/customer information 830 to customer database server 130.

Figure 16:
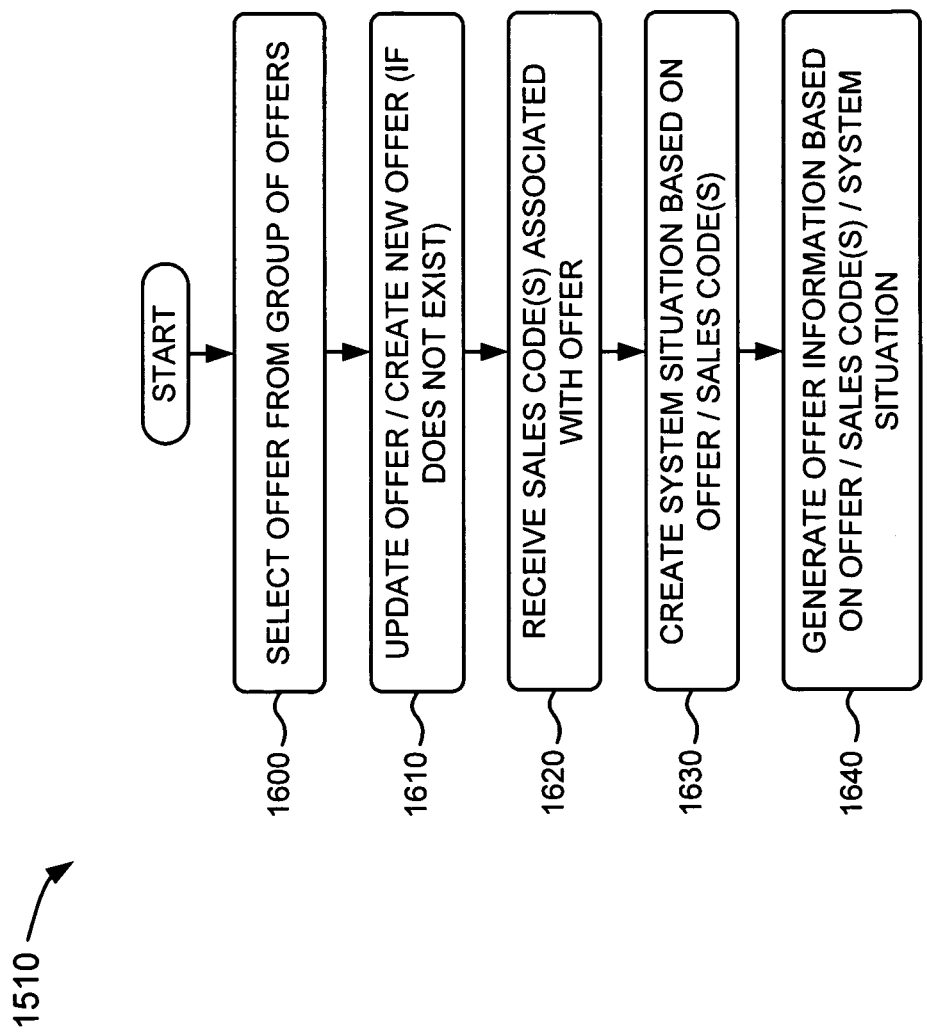

Process block 1510 may include the process blocks illustrated in FIG. 16. As shown in FIG. 16, process block 1510 may include selecting an offer from a group of offers (block 1600), and updating the selected offer or creating a new offer if the selected offer does not exist (block 1610). For example, in one implementation described above in connection with FIG. 9, offer/SOM rule loading logic 910 of offer management server 150 may select an offer from a group of offers (e.g., provided in source tables), and may update the offer (e.g., based on offer input(s) 810, customer data/models/reports 360, scored/segmented customer information 620, offer information 820, and/or feedback 840) or may create a new offer (e.g., if the offer does not exist).

As further shown in FIG. 16, one or more sales codes associated with the selected offer may be received (block 1620), a system situation may be created based on the selected and the one or more sales codes (block 1630), and offer information may be generated based on the selected offer, the one or more sales codes, and the system situation (block 1640). For example, in one implementation described above in connection with FIG. 9, offer/SOM rule loading logic 910 may receive one or more sales codes associated with the selected offer, and may create a system situation (e.g., customer has Internet, telephone, and television services and calls to disconnect the Internet service but wants to keep their telephone service) based on the selected offer and the one or more sales codes. Offer/SOM rule loading logic 910 may generate offer information (e.g., offer customer additional $10.00 savings for six months on Internet service) based on the selected offer, the one or more sales codes, and the system situation.

Figure 17:
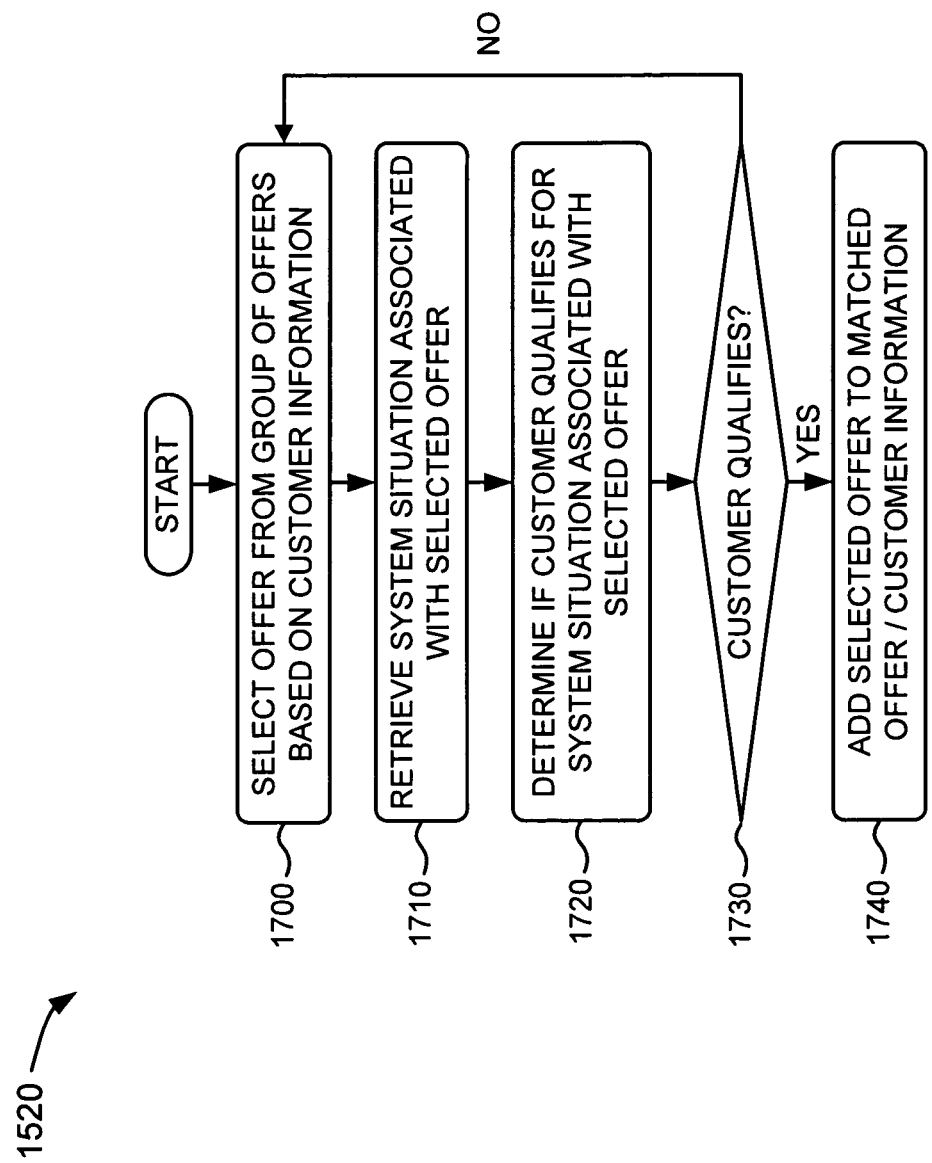

Process block 1520 may include the process blocks illustrated in FIG. 17. As shown in FIG. 17, process block 1520 may include selecting an offer from a group of offers based on customer information (block 1700), retrieving a system situation associated with the selected offer (block 1710), and determining if the customer qualifies for the system situation associated with the selected offer (block 1720). For example, in one implementation described above in connection with FIG. 9, SOM engine logic 930 of offer management server 150 may select an offer from a group of offers based on customer information (e.g., customer data/models/reports 360 and/or scored/segmented customer information 620), and may retrieve a system situation (e.g., customer has Internet, telephone, and television services and calls to disconnect the Internet service but wants to keep their telephone service) associated with the selected offer. SOM engine logic 930 may determine if a customer qualifies for the system situation associated with the selected offer.

As further shown in FIG. 17, if the customer does not qualify for the system situation (block 1730—NO), process may return to block 1700. If the customer qualifies for the system situation (block 1730—YES), the selected offer may be added to the matched offer/customer information (block 1740). For example, in one implementation described above in connection with FIG. 9, if the customer does not qualify for the system situation, SOM engine logic 930 may select another offer from the group of offers. If the customer does qualify for the system situation, SOM engine logic 930 may add the selected offer to matched offer/customer information 830. Such an arrangement may match one or more offers to a particular customer based on existing conditions (e.g., a customer profile) and dynamic conditions (e.g., the customer's situation at a time of interaction with the customer service representative).

Figure 18:
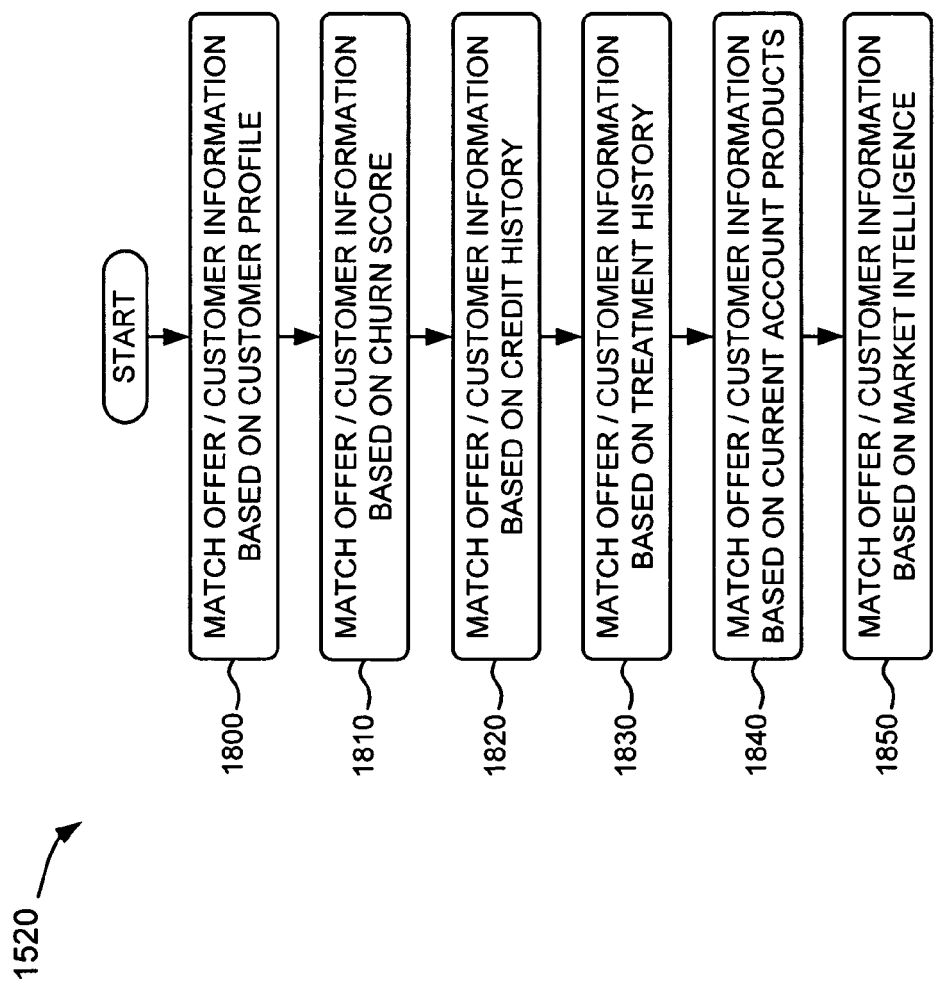

Alternatively and/or additionally, process block 1520 may include the process blocks illustrated in FIG. 18. As shown in FIG. 18, process block 1520 may include matching the offer/customer information based on a customer profile (block 1800), matching the offer/customer information based on a customer churn score (block 1810), matching the offer/customer information based on a customer credit history (block 1820), matching the offer/customer information based on a customer treatment history (block 1830), matching the offer/customer information based on a customer account products (block 1840), or matching the offer/customer information based on market intelligence (block 1850). For example, in one implementation described above in connection with FIG. 8, offer management server 150 may use customer data/models/reports 360, scored/segmented customer information 620, and/or offer information 820 to match customer information (e.g., customer names, addresses, telephone numbers, personal information, company information, etc.) with offer information 820, and to generate matched offer/customer information 830. Matched offer/customer information 830 may include user defined rules associated with one or more offers (e.g., rules that define what products and/or service to offer a particular customer and when to offer such products and/or services). In one example, the user defined rules may be based on a customer's profile, churn score (e.g., likelihood to cease purchasing a product and/or service), credit history, treatment history, current account products and/or services, market intelligence, etc.

Process block 1540 may include the process blocks illustrated in FIG. 19. As shown in FIG. 19, process block 1540 may include conveying the matched offer/customer information to customers via email (block 1900), conveying the matched offer/customer information to customers via direct mail (block 1910), conveying the matched offer/customer information to customers via telephone (block 1920), and/or conveying the matched offer/customer information to a vendor system for conveying to customers (block 1930). For example, in one implementation described above in connection with FIG. 8, offer management server 150 may provide matched offer/customer information 830 to user device 110 and communication server 160. Communication server 160 may provide matched offer/customer information 830 to vendor system 340 and/or email system 350. Vendor system 340 and/or email system 350 may distribute offers (e.g., contained in matched offer/customer information 830) to customers (e.g., contained in matched offer/customer information 830), via telephone, email, direct mail, etc. User device 110 (e.g., with or without marketer 320) may convey one or more offers contained in matched offer/customer information 830 to customer 330. In one example, user device 110 may email the one or more offers to customer 330. In another example, user device 110 may be used by marketer 320 to contact customer 330 and to convey the one or more offers to marketer 320 while marketer 320 verbally interacts with customer 330 (e.g., a telemarketing arrangement).

Implementations described herein may include systems and/or methods that retain existing customers, win back lost customers, and provide an offer management application for automatically managing, matching, filtering, and/or prioritizing credit and product/service offers available to customers based on a variety of factors. For example, in one implementation, the offer management application may receive offer information and customer information, and may match the offer information with the customer information based on system defined rules and user defined rules. The offer management application may generate matched offer/customer information based on the matching, and may convey the matched offer/customer information to customers. Feedback may be received by the offer management application from the customers about the matched offer/customer information, and the offer management application may update the matched offer/customer information based on the received feedback.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13-19, the order of the blocks may be modified in other implementations. Further, non-dependent blocks may be performed in parallel.

Also, the term "user" has been used herein, and is intended to be broadly interpreted to include user device 110 or a user (e.g., marketing manager 310, marketer 320, etc.) of user device 110.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a non-transitory server device, offer information associated with one or more products or one or more services;
   receiving, at the non-transitory server device, customer information associated with one or more customers,
      the customer information including customer condition information associated with the one or more products or the one or more services;
   determining, using the non-transitory server device, a matching of the offer information with the customer information based on:
      system-defined rules that define products or services to offer to the one or more customers and define under what conditions to offer the products or services, and
      user-defined rules based on at least one or more of:
         information regarding a profile associated with the one or more customers,
         information regarding a churn score associated with the one or more customers,
         information regarding a credit history associated with the one or more customers,
         information regarding a treatment history associated with the one or more customers,
         information regarding current account products or current account services associated with the one or more customers, or
         information regarding market intelligence associated with the one or more customers;
   generating, using the non-transitory server device, matched offer and customer information based on the matching; and
   conveying, using the non-transitory server device, the matched offer and customer information in an order of priority.

2. The method of claim 1, further comprising:
   receiving, at the non-transitory server device, feedback from the one or more customers about the matched offer and customer information; and
   updating, at the non-transitory server device, the matched offer and customer information based on the feedback.

3. The method of claim 1, where receiving the offer information comprises:
   selecting an offer from a group of offers;
   receiving one or more sales codes associated with the selected offer;
   creating a system situation based on the selected offer and the one or more sales codes; and
   generating the offer information based on the selected offer, the one or more sales codes, and the system situation.

4. The method of claim 1, where determining the matching of the offer information with the customer information comprises:
   selecting an offer from a group of offers based on the customer information;
   retrieving a system situation associated with the selected offer;

determining, based on the customer information, that a customer, of the one or more customers, qualifies for the system situation associated with the selected offer; and adding the selected offer to the matched offer and customer information based on determining that the customer qualifies for the system situation.

5. The method of claim 1, further comprising one or more of:

conveying the matched offer and customer information to the one or more customers via email;

conveying the matched offer and customer information to the one or more customers via direct mail;

conveying the matched offer and customer information to the one or more customers via telephone; or conveying the matched offer and customer information to a vendor system for conveying to the one or more customers.

6. A non-transitory computer-readable medium storing instructions, the instructions comprising:

one or more instructions that, when executed by at least one processor, cause the at least processor to:

receive offer information associated with one or more products or one or more services;

receive customer information associated with one or more customers, the customer information including customer condition information associated with the one or more products or the one or more services;

determine a matching of the offer information with the customer information based on:

system-defined rules that define products or services to offer to the one or more customers and define under what conditions to offer the products or services, and user-defined rules based on at least one or more of:

information regarding a profile associated with the one or more customers, information regarding a churn score associated with the one or more customers, information regarding a credit history associated with the one or more customers, or information regarding a treatment history associated with the one or more customers;

generate matched offer and customer information based on the matching;

convey the matched offer and customer information in an order of priority.

7. The non-transitory computer-readable medium of claim 6, where the instructions further comprising comprise:

one or more instructions that, when executed by the at least one processor, cause the at least processor to:

automatically convey the matched offer and customer information to one or more devices associated with the one or more customers.

8. The non-transitory computer-readable medium of claim 6, where the offer information comprises at least one of:

a product to offer in a bundle;
a service to offer in a bundle;
a credit and product or service bundle;
a price of a product;
a price of a service;
a product to offer for sale; or
a service to offer for sale.

9. The non-transitory computer-readable medium of claim 6, where the customer information comprises at least one of:

customer data;
a customer model;
a customer report;
a customer name;
a customer address;
a customer telephone number;
scored and segmented customer information;
customer personal information; or
company information.

10. The non-transitory computer-readable medium of claim 6, where the one or more instructions to generate the matched offer and customer information comprise:

one or more instructions that, when executed by the at least one processor, cause the at least processor to:

generate the matched offer and customer information based on the matching and one or more rules that define what particular products or services to offer to a particular customer, of the one or more customers, and when to offer the particular products or services.

11. The non-transitory computer-readable medium of claim 6, where the instructions further comprise:

one or more instructions that, when executed by the at least one processor, cause the at least processor to:

track a matched offer, of the matched offer and customer information, to prevent a duplicate of the matched offer from being conveyed to a same device associated with the one or more customers.

12. The non-transitory computer-readable medium of claim 6, where a particular customer, of the one or more customers, comprises a person or a business entity capable of purchasing the one or more products or the one or more services.

13. The non-transitory computer-readable medium of claim 6, where the instructions further comprise:

one or more instructions that, when executed by the at least one processor, cause the at least processor to:

provide, for display, the matched offer and customer information to a marketer, and where the marketer comprises a person responsible for interacting with the one or more customers to market the one or more products or the one or more services.

14. The non-transitory computer-readable medium of claim 6, where the instructions further comprise:

one or more instructions that, when executed by the at least one processor, cause the at least processor to:

receive feedback from the one or more customers about the matched offer and customer information; and update the matched offer and customer information based on the feedback.

15. The non-transitory computer-readable medium of claim 10, where the instructions further comprise:

one or more instructions that, when executed by the at least one processor, cause the at least processor to:

select an offer from a group of offers;

receive one or more sales codes associated with the selected offer;

create a system situation based on the selected offer and the one or more sales codes; and generate the offer information based on the selected offer, the one or more sales codes, and the system situation.

16. The non-transitory computer-readable medium of claim 6, where the one or more instructions to generate the matched offer and customer information comprises:

one or more instructions that, when executed by the at least one processor, cause the at least processor to:
  select an offer from a group of offers based on the customer information;
  retrieve a system situation associated with the selected offer;
  determine, based on the customer information, that a customer, of the one or more customers, qualifies for the system situation associated with the selected offer; and
  add the selected offer to the matched offer and customer information based on determining that the customer qualifies for the system situation.

17. The non-transitory computer-readable medium of claim 10, where the one or more instructions to determine the matching comprise:
one or more instructions that, when executed by the at least one processor, cause the at least processor to:
  determine a matching of the offer information with the customer information based on the system-defined rules, the user-defined rules, and one or more of:
    information based on current account products or current account services associated with the one or more customers; or
    information based on market intelligence associated with the one or more customers.

18. The non-transitory computer-readable medium of claim 6, where the instructions further comprise at least one of:
  one or more instructions that, when executed by the at least one processor, cause the at least processor to convey the matched offer and customer information to the one or more customers via email; or
  one or more instructions that, when executed by the at least one processor, cause the at least processor to convey the matched offer and customer information to a vendor system for conveying to the one or more customers.

19. A system comprising:
a server, implemented at least partially in hardware, to:
  receive offer information associated with one or more products or services;
  receive customer information associated with one or more customers,
    the customer information including customer condition information associated with the one or more products or services;
  determine a matching of the offer information with the customer information based on:
    system-defined rules that define products or services to offer to the one or more customers and define under what conditions to offer the products or services, and
    user-defined rules that include at least one of:
      information associated with a customer profile,
      information associated with a customer churn score,
      information associated with a customer credit history,
      information associated with a customer treatment history,
      information associated with a customer account product or service, or
      information associated with market intelligence;
  generate matched offer and customer information based on the matching; and
  convey the matched offer and customer information in an order of priority.

20. The system of claim 19, where the server is further to:
receive feedback from the one or more customers about the matched offer and customer information; and
update the matched offer and customer information based on the feedback.

* * * * *